(12) United States Patent
Watanabe

(10) Patent No.: US 9,159,255 B2
(45) Date of Patent: Oct. 13, 2015

(54) THREE-DIMENSIONAL INFORMATION PRESENTATION DEVICE USING SLIT VIEWING

(75) Inventor: Junji Watanabe, Chibaa (JP)

(73) Assignee: JAPAN SCIENCE AND TECHNOLOGY AGENCY, Saitama (JP)

( * ) Notice: Subject to any disclaimer, the term of this patent is extended or adjusted under 35 U.S.C. 154(b) by 650 days.

(21) Appl. No.: 13/298,546

(22) Filed: Nov. 17, 2011

(65) Prior Publication Data

US 2012/0062988 A1 Mar. 15, 2012

Related U.S. Application Data

(63) Continuation of application No. PCT/JP2010/058989, filed on May 27, 2010.

(30) Foreign Application Priority Data

May 29, 2009 (JP) .................................. 2009-130302

(51) Int. Cl.
| | |
|---|---|
| H04N 7/18 | (2006.01) |
| G09F 19/14 | (2006.01) |
| G02B 27/22 | (2006.01) |
| G09F 9/33 | (2006.01) |
| G09F 11/02 | (2006.01) |
| G09F 27/00 | (2006.01) |
| G09G 3/00 | (2006.01) |

(52) U.S. Cl.
CPC .............. *G09F 19/14* (2013.01); *G02B 27/225* (2013.01); *G02B 27/2285* (2013.01); *G09F 9/33* (2013.01); *G09F 11/02* (2013.01); *G09F 27/00* (2013.01); *G09G 3/003* (2013.01); *G09G 3/004* (2013.01)

(58) Field of Classification Search
CPC .......... H04N 13/0497; H04N 13/0404; H04N 13/0409
USPC ....................................................... 348/42–60
See application file for complete search history.

(56) References Cited

U.S. PATENT DOCUMENTS

| 6,736,512 | B2 * | 5/2004 | Balogh .............................. 353/7 |
| 7,961,182 | B2 * | 6/2011 | Tachi et al. .................... 345/419 |
| 2008/0043014 | A1 | 2/2008 | Tachi et al. |

FOREIGN PATENT DOCUMENTS

| JP | 07-120701 | 5/1995 |
| JP | 08-179717 | 7/1996 |

(Continued)

OTHER PUBLICATIONS

Tomohiro Endo et al., "Cylindrical 3-D Display Observable from All Directions", Journal D-II of The Institute of Electronics, Information, and Communication Engineers, vol. J84-D-II, No. 6, pp. 1003-1011, (2001) w/ English language abstract.

*Primary Examiner* — Andy Rao
(74) *Attorney, Agent, or Firm* — Wenderoth, Lind & Ponack, L.L.P.

(57) ABSTRACT

Provided is a device which can present three dimensional information by a simple structure and in which the information can be viewed with the naked eye. A plurality of rotary line-light-source units are arranged. The line-light-source units provide different pieces of image information in different directions, in order to produce a parallax between both eyes. A three-dimensional image control unit performs a control to provide thinned image information at corresponding positions to the plurality of line-light-source units and successively present the entire three-dimensional image information by scrolling. As a result, a viewer can recognize the three-dimensional image moved and presented by the scroll control.

17 Claims, 21 Drawing Sheets

(56) References Cited

FOREIGN PATENT DOCUMENTS

| JP | 09-311659 | 12/1997 |
| JP | 10-333634 | 12/1998 |
| JP | 2003-195214 | 7/2003 |
| JP | 2004-177709 | 6/2004 |
| JP | 2006-189962 | 7/2006 |
| WO | 2006/070499 | 7/2006 |

* cited by examiner

FIG. 12A
FIG. 12B
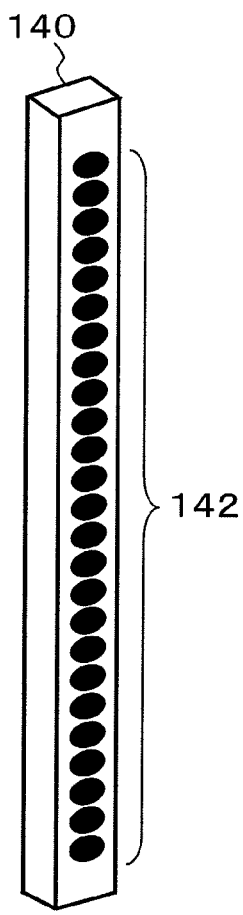
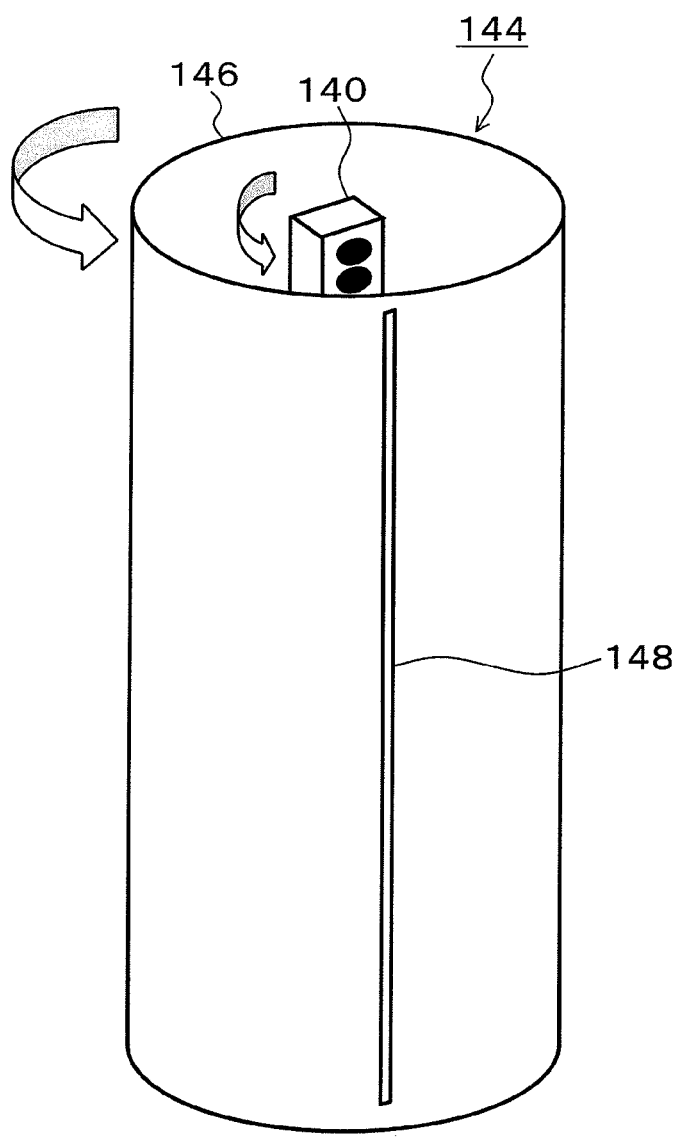

THREE-DIMENSIONAL INFORMATION PRESENTATION DEVICE USING SLIT VIEWING

This application is a Continuation Application of International Application No. PCT/JP2010/058989, filed May 27, 2010.

TECHNICAL FIELD

The present invention relates to a three-dimensional information presentation device that enables naked eyes to view stereoscopic images by rotating a slit and changing the direction of light rays.

BACKGROUND ART

In order to display a three-dimensional stereoscopic image, physiological stereoscopic elements by which a person senses the stereoscopic feeling and perspective are utilized. The physiological stereoscopic elements include: binocular parallax which is the difference between the images viewed by the left and right eyes, binocular convergence which is the rotation angle of eye balls serving as an intersecting point of visual lines, focal-point adjustment which is change in the thickness of a lens for adjusting the focal point, and kinematic parallax which is the difference between the images viewed by eyes because of movement. Among these physiological stereoscopic elements, binocular parallax is conventionally utilized in display of three-dimensional images. The basic principle of the three-dimensional image display utilizing the binocular parallax is the technique realized by reproducing the images viewed by the respective left and right eyes to show them as if the images are stereoscopic images. The binocular parallax is the phenomenon generated since the left and right eyes are distant from each other, wherein an object in front of the face is perceived when two types of images viewed from two different directions are transmitted to the brain even when the face is not moved. The three-dimensional image presenting technique utilizing the binocular parallax is the technique that presents mutually different images to the left and right eyes, respectively, and the techniques can be largely categorized into the methods utilizing glasses and the methods not requiring glasses. The methods utilizing glasses include the anaglyph method, the shutter glasses method, etc. The anaglyph method is the method in which: glasses which are red for the right eye and blue for the left eye are used; and, when one image printed the image for the right eye by red and printed the image for the left eye by blue is viewed by the glasses, the blue image is not viewed by the right eye but only the image of the right eye is viewed as a result, and the red image cannot be similarly viewed by the left eye, and the images having parallax between the both eyes are presented, thereby causing the images to be viewed as a three-dimensional image. The shutter glasses method is the method in which: a projector such as a liquid crystal shutter and shutters of glasses are synchronized, the left shutter is closed while the image of the right eye is projected, the left one is configured in the opposite manner, and the shutters are switched more than several tens of times per one second, thereby causing the images to be viewed as three-dimensional images by causing the viewer to feel as if he/she is viewing the images by both eyes by the afterimage effect. The methods not utilizing glasses include the parallax barrier method, the lenticular lens method, the holographic stereogram method, etc. The parallax barrier method is the method in which the images for the left and right eyes are displayed by utilizing shielding parts and openings through slits, which are narrow long transmission windows, thereby causing the images to be viewed as three-dimensional images. The lenticular lens method is the method in which the images of the left and right eyes are displayed by an assembly of extremely-narrow convex lenses called a lenticular lens instead of a slit, thereby causing the images to be viewed as three-dimensional images. The holographic stereogram method is the method in which: images of a stereoscopic object are taken with shifted hologram directions, a slit is placed in front of a display material to display a hologram, thereby generating left/right parallax by the principle similar to the parallax barrier method and presenting the stereoscopic feeling. In these three-dimensional image methods, the viewer has to wear a some sort of device, for example, has to wear glasses in the anaglyph method, and a some sort of special device has to be placed in the presenting device side, for example, the parallax barrier method not using glasses requires slit equipment, and the lenticular lens method requires a special lens. It is cumbersome for a viewer to use glasses or the like, and there is a defect that, for example, the faces of each other cannot be seen. Therefore, preferably, it is desired to view three-dimensional images by naked eyes; however, the methods not using glasses have a defect that the device configuration becomes complex. For example, in the light-ray reproducing method, the configuration for scanning a line light source is required. The light-ray reproducing method realizes parallax of light sources from slits by moving a one-dimensional light source. Therefore, three-dimensional image information is presented only within the range in which the light source can be moved. However, there is an example proposing a full-circle three-dimensional display in which a line light source is rotated (for example, see Non-Patent Document 1). The full-circle three-dimensional display rotates a line light source to pre sent the entirety of a three-dimensional image, and the three-dimensional image can be viewed from an arbitrary position. However, the presentation range is limited to an inner region of the rotating line light source, and the scale of the device is increased, which is not necessarily a simple device. As a proposition for simplifying a three-dimensional image presentation device and reducing cost, there is proposed a method in which: a plurality of one-dimensional display elements are used to sequentially subject one-dimensional patterns corresponding to column components of a plurality of images of a three-dimensional object taken from a plurality of directions to time division and display, and the time-divided and displayed one-dimensional patterns are deflected in a plurality of directions corresponding to display patterns by an image deflecting device such as a mirror or an acousto-optic element to deflect them in a plurality of directions corresponding to the directions of the point of image pickup, thereby presenting images (for example, see Patent Document 2). On the other hand, as a method of displaying two-dimensional image information, there is proposed a method in which two-dimensional matrix information is displayed by thinned display units, and scroll control is carried out, thereby carrying out virtual display as if all matrices are displayed (for example, see Patent Document 2 to Patent Document 4). In this method, slit-shaped light sources are disposed with a certain interval, the display light sources corresponding to the pixels of all the matrices necessary for two-dimensional display are not required, and an image of a large screen can be presented by a small number of display elements. Therefore, this can be realized by a simple device. There is no three-dimensional information presentation device using such a method.

Patent Document 1: Japanese Patent Application Laid-Open (kokai) No. 2006-189962
Patent Document 2: Japanese Patent Application Laid-Open (kokai) No. Hei7-120701
Patent Document 3: Japanese Patent Application Laid-Open (kokai) No. Hei8-179717
Patent Document 4: Japanese Patent Application Laid-Open (kokai) No. Hei9-311659
Patent Document 5: Japanese Patent Application Laid-Open (kokai) No. Hei10-333634
Non-Patent Document: "Cylindrical 3-D observable form All Direction" written by Tomohiro Endo, Yoshihiro Kajiki, Toshio Honda, and Makoto Sato Journal D-II of The Institute of Electronics, Information, and Communication Engineers Vol. J84-D-II No. 6, pp 1003-1011, (2001)

Problems to be Solved by the Invention

Since physiological stereoscopic elements have to be utilized in order to stereoscopically express images, the realizing means therefor inevitably becomes complex. Since the stereoscopic feeling is expressed by using binocular parallax in many cases, mutually different images have to be presented to the left and right eyes, respectively. In presentation of three-dimensional images, the amount of presented information is predominantly large compared with that of two-dimensional images, there is a strong demand for enabling naked eyes to view stereoscopic images, and it is a problem to realize a device capable of solving these problems and presenting three-dimensional images by a simple structure.

DISCLOSURE OF THE INVENTION

According to the present invention to provide an information display system according to the present invention to provide a three-dimensional information presentation device capable of enabling viewing by naked eyes and presenting three-dimensional images by a simple configuration.

The present invention can realize a three-dimensional information presentation device capable of presenting images which produce binocular parallax by changing images at every different angle while rotating a line light source and capable of presenting three-dimensional images by juxtaposing a plurality of line-light-source units for presenting only part of the three-dimensional images and carrying out scrolling control. Details will be described below. This is merely an example, and the technical range of the present invention is not limited thereto.

(1) A three-dimensional information presentation device having: a plurality of line-light-source units presenting information in different directions while rotating; and a control unit carrying out control of transmitting thinned three-dimensional image information to the line-light-source unit, presenting images for providing parallax corresponding to the angle of rotation of the line-light-source unit, and presenting an entire image by scrolling the images presented by the plurality of line-light-source units.

In the invention according to (1), the line-light-source unit, which is a one-dimensional line light source and emits light having directionality, is used as a basic unit; and line light sources are caused to present images in accordance with input image information at an every certain angle while rotating the plurality of line-light-source units, thereby realizing presentation of the images producing parallax to both eyes by presentation of the image information that is different at the positions having different angles. The present invention is a new method which presents images at different angles while rotating the line light sources per se.

The single line-light-source unit displays a three-dimensional image while thinning part thereof. For example, if five line-light-source units are disposed, part of the entire three-dimensional image is allocated to each of the line-light-source units. In other words, the display images among the line-light-source units are thinned and allocated to each of the single line-light-source units, respectively. When the three-dimensional image of the range allocated to the single line-light-source units is subjected to scroll control at a certain speed, the brain senses as if the entire three-dimensional image is presented in combination with the afterimage effect, and the viewer perceives the three-dimensional image.

Control of image data is controlled by the control unit serving as hardware connected to the line-light-source units, wherein data is read from a storage unit of the image data, and distribution of image data, presentation image data at the line light sources, the timing thereof, scrolling speed, etc. are optimally controlled to present the three-dimensional image.

(2) The three-dimensional information presentation device according to (1), wherein the line-light-source unit has a line-light-source element having a plurality of point light sources disposed in parallel to a rotation center axis, the point light sources being linearly disposed to constitute a point-light-source column configuration; and a linear opening in front of the line-light-source element to correspond to the line-light-source element, the opening allowing passage of light.

The invention according to (2) is the structure of the line-light-source unit of (1). The line light source has to produce the light having directionality and is an element having the point-light-source column in which the point light sources are one-dimensionally arranged in order to realize the line-light-source element which one-dimensionally generates linear light. In addition, the opening serving as a long and narrow transmission window is provided in front of the point-light-source column, and directionality is realized by emitting light from the opening by the point light sources. The light is shielded at the part other than the opening. Different images are presented by changing angles while rotating the sources having such a structure.

(3) The three-dimensional information presentation device according to (1) or (2), wherein the line-light-source unit rotates while the line-light-source element and the opening are integrated.

In the invention according to (3), the line-light-source element and the opening are integrally rotated. Since the light from the light source can be seen only through the opening, the light ray having directionality can be generated in the full-circle directions of 360 degrees.

(4) The three-dimensional information presentation device according to (1) or (2), wherein the line-light-source unit enables emission of light in a full-circle direction by disposing a plurality of line-light-source elements; causes the plurality of line-light-source elements to stand still; and rotates the opening in front of the line-light-source element.

In the invention according to (4), light can be emitted in the full-circle directions by disposing the plurality of line-light-source elements in the rotating opening, and the light ray having directionality can be generated only by the rotation of the opening. The line-light-source elements are kept stand still, and different images are presented by the directions connecting the opening and the rotation center axis.

(5) The three-dimensional information presentation device according to (1) or (2), wherein the line-light-source unit enables emission of light in a full-circle direction by disposing a plurality of the line-light-source elements, has the opening corresponding to the front of each of the line-light-source element, and integrally rotates the line-light-source element and the opening.

The invention according to (5) is the three-dimensional information presentation device, wherein the plurality of line-light-source elements are disposed at an approximately equal interval on an isoperimetric surface of the rotation center axis, and slit-shaped openings are provided to correspond to the line-light-source elements, respectively. The openings corresponding to the number of the line-light-source elements that are provided on the isoperimetric surface so that different images can be presented. The same image is presented from each of the openings when in the same direction because of rotation; therefore, even when the rotating speed of the sources is reduced, the number of display images can be equalized to that of the case in which the line-light-source element is single. When mutually different three-dimensional images are presented by the line-light-source elements by rotating the sources at the same rotating speed, a synthesized three-dimensional image can be presented by the three-dimensional image presentation device.

(6) The three-dimensional information presentation device according to (1) or (2), wherein the line-light-source unit has three line-light-source elements composed of a red line-light-source element, a green line-light-source element, and a blue line-light-source element which are three primary colors of light and the opening corresponding to the front of each of the line-light-source element; and integrally rotates the point-line-light-source element and the opening.

The invention according to (6) can be the device provided with the light sources which emit three colors of red, green, and blue which are the three primary colors of light, wherein the images from the light sources can be synthesized to present color three-dimensional image information.

(7) The three-dimensional information presentation device according to any of (1) to (6), wherein, in order to present images producing binocular parallax to left and right eyes, the control unit transmits different images depending on the direction of a slit of the rotating line-light-source unit to control the images presented by the line-light-source unit.

The invention according to (7) is a control method in the control unit for producing binocular parallax. The left eye and the right eye has an interval of about 70 mm; wherein, normally, different shapes, i.e., the objects as the image information with different angles are viewed as the object viewed from the left eye and the object viewed from the right eye. The brain stereoscopically senses the object because of the parallax images. Therefore, in order to present the images which produce binocular parallax by the openings, control is carried out so that, for example, the image information desired to be perceived by the left eye is presented at the angle viewable by the left eye and the image information desired to be perceived by the right eye is presented at the angle viewable by the right eye by utilizing the fact that the images viewable by the left and right eyes are different depending on the rotation angle of the line-light-source units.

(8) The three-dimensional information presentation device according to any of (1) to (7), wherein the control unit carries out control of presenting the image information partially thinned for presenting three-dimensional information by the line-light-source unit, the image information being the image information producing the binocular parallax, and synchronously scrolling and presenting blinking of light sources among the plurality of line-light-source units in order to present the thinned three-dimensional information apparently as the entirety of the three-dimensional image.

The invention according to (8) is a control method of the control unit for apparently presenting an entire image by controlling presentation of thinned three-dimensional images. The image information presented by the line-light-source units is thinned images which produce binocular parallax, and this is a control method for causing the viewer to view the entire three-dimensional image.

The thinned three dimensional images are skipped images when focused on a certain moment, and the images do not present the entire three-dimensional image. However, when scrolling is carried out at an appropriate speed in the case in which scroll control of presenting part of the entire image sequentially in terms of time by the divided and distributed line-light-source units is carried out, the viewer complements and views the images between the line-light-source units, the brain senses as if the entire three-dimensional image is present, and the entire image is perceived by scrolling even with the line-light-source units of less than the actual presentation. When the line-light-source unit is synchronized with the other plurality of line-light-source units in this manner to carry out scroll control of presenting the information of the entire three-dimensional image so as to produce binocular parallax, a virtual three-dimensional image can be perceived as if the image is displayed while moving the entire three-dimensional image.

(9) A three-dimensional information presentation device comprising: a plurality of line-light-source units having a plurality of light sources disposed with openings provided in front, the light sources being disposed at positions mutually shifted on an isoperimetric surface so that concentric circles of rotation of the light sources are not overlapped in the direction of a rotation axis, the line-light-source units presenting information in mutually different directions while rotating; and a control unit of carrying out control of transmitting thinned three-dimensional image information to the line-light-source unit, presenting an image providing parallax corresponding to the direction of the line-light-source unit, and scrolling the image presented to the plurality of line-light-source units to present an entire image.

The invention according to (9) is the invention about the arrangement of the light sources. A basic characteristic of the present invention is to rotate the light having directionality, wherein different images can be presented at different angles in full-circle directions in one rotation. Therefore, there is no need to linearly dispose the light sources on the isoperimetric surface in parallel to the rotation axis and blink the light sources at the same time; and, even when the positions of the light sources are deviated from the line parallel to the rotation axis, timing can be controlled so as to present the images of the case in which they are linearly disposed when in the same direction. Therefore, one point light source can be spirally disposed on the isoperimetric surface or disposed alternately in two columns. In that case, the distances between the light sources can be shortened than the case in which they are linearly disposed, and the effect of improving resolution can be obtained.

(10) The three-dimensional information presentation device according to (9), wherein the line-light-source unit has the plurality of line-light-source elements disposed with different angles to that point light sources are continuous, and a linear opening allowing transmission of light in front of a column of the point light sources so as to correspond to the plurality of line-light-source elements.

The invention according to (9) is applied to the invention according to (10) in order to expand the image presentation region in the vertical direction by using the line-light-source elements having the point-light-source column.

(11) The three-dimensional information presentation device according to (9), wherein the line-light-source unit rotates while the line-light-source element and the opening are integrated.

The invention according to (11) is the three-dimensional information presentation device which generates the light ray having directionality in the full-circle directions by rotating the invention according to (10) while the line-light-source element and the opening are integrated.

(12) The three-dimensional information presentation device according to any of (1) or (9), wherein the plurality of line-light-source units can be changed to an arbitrary position.

The invention according to (12) relates to the arrangement of the line-light-source units. The line-light-source unit according to the present invention has the structure that the slit per se rotates, there is no need to scan the light source like the light-ray reproducing method, and the line-light-source unit can be viewed from every angle; therefore, there is a characteristic that the arrangement of the line-light-source units can be changed to arbitrary positions. In presentation of the image information, the image data is controlled by the control unit in accordance with the arrangement of the line-light-source units to present the three-dimensional image.

Means for solution in the present invention has been described above. However, the present invention is not limited to the above description, and other modes can be employed within the range that pertains to the technical range.

According to the present invention, the presentation unit of the three-dimensional information is the line-light-source unit, which is composed of the simple structure of the combination of the point-light-source column and the slit; and, there is an effect that images having binocular parallax can be easily presented by presenting different images viewed by the left and right eyes in accordance with the angles while rotating. When focused on a certain moment, part of thinned three-dimensional images can be presented instead of the entire three-dimensional image to present the entire three-dimensional image by scrolling. Therefore, the effect of enabling presentation of the three-dimensional image with a small number of presentation units can be obtained.

BRIEF DESCRIPTION OF DRAWINGS

FIGS. 12A and 12B are drawings explaining a rotary line-light-source unit using a line-light-source element provided with one-dimensional point-light-source column;

BEST MODE FOR CARRYING OUT THE INVENTION

Hereinafter, modes for carrying out the present invention will be explained with reference to drawings. These are merely examples, and the technical range of the present invention is not limited thereto.

First Embodiment

Figure 1:
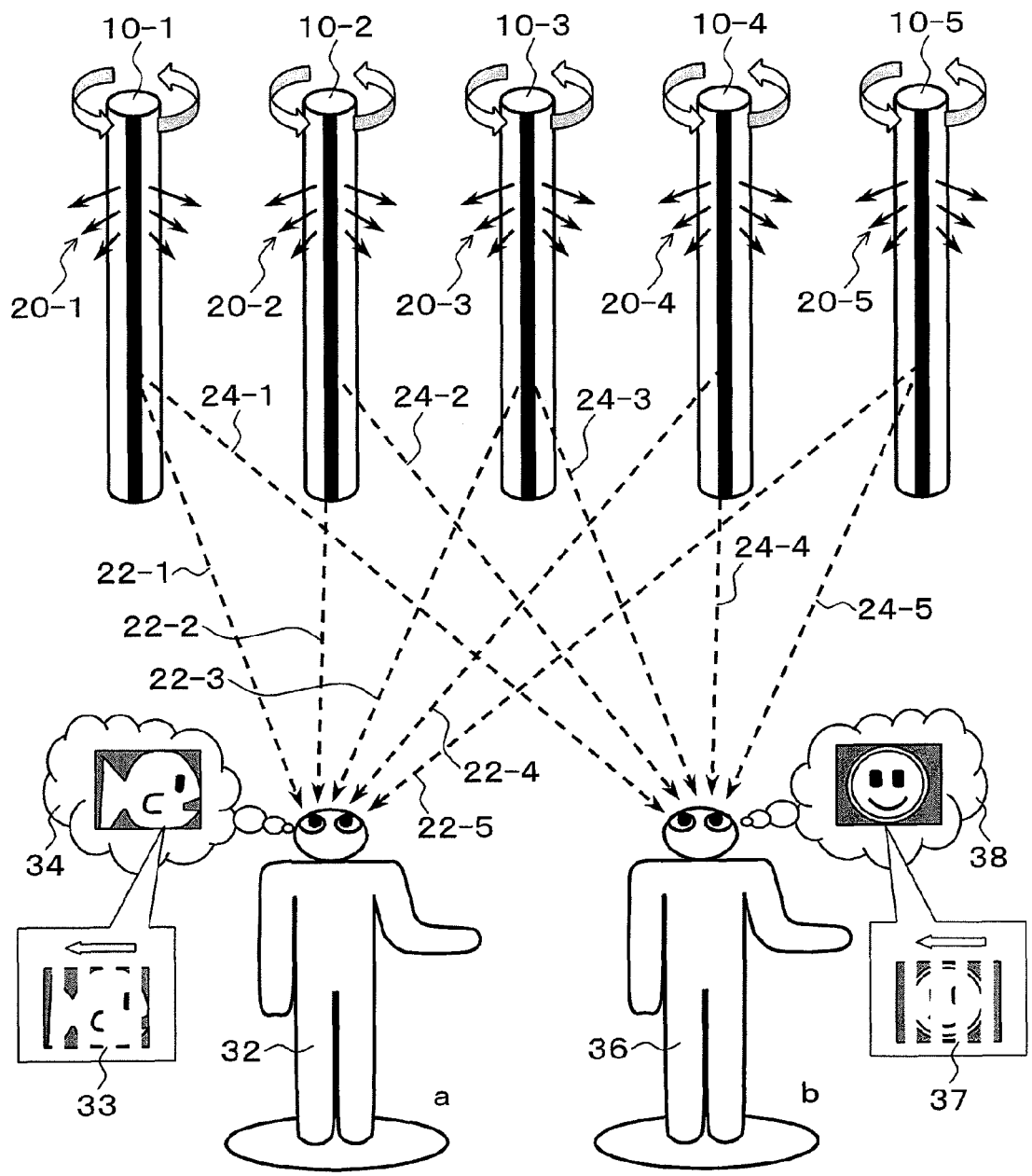
FIG. 1 is a drawing showing an outline of the case in which rotary line-light-source units of the present invention are disposed to perceive three-dimensional images.

FIG. 1 is a schematic drawing of the present invention. In FIG. 1, line-light-source units 10-1 to 10-5 radiate light rays 20-1 to 20-5 of images by line light sources of which directions are changed while rotating. Since a viewer a32 and a viewer b36 are at different positions, each of the line-light-source units 10-1 to 10-5 is viewed from different angles. For example, when the viewer a32 views the line-light-source unit 10-3, the light ray is perceived when the unit is in the direction of a light ray 22-3. Meanwhile, the viewer b36 perceives the light ray from the line-light-source unit 10-3 when the unit is in the direction of a light ray 24-3. Therefore, when different images are presented from the line-light-source units 10-1 to 10-5, respectively, when the angles thereof are in the directions that enable the viewer a32 and the viewer b36 to view the images, the viewer a32 perceives an image 34, and the viewer b36 perceives an image 38. In the present invention, thinned image information is presented by the line-light-source units 10-1 to 10-5 to present an overall image by scrolling. Therefore, practically, light rays 22-1 to 22-5 serving as the image information cause the eyes of the viewer a32 at a certain moment to perceive a thinned image 33. Also, light rays 24-1 to 24-5 serving as the image information cause the eyes of the viewer b36 to perceive a thinned image 37. When the image 33 viewed by the viewer a32 and the image 37 viewed by the viewer b36 are scrolled from the right to the left in FIG. 1 in the direction of the arrows to sequentially present thinned images, the overall images are viewed, and the viewer a32 perceives that as if he/she is watching the image 34, and the viewer b36 perceives that as if he/she is watching the image 38. In this case, if the viewer a32 and the viewer b36 are the left eye and the right eye, respectively, different images are perceived by the both eyes. Furthermore, if images complementing the part between the line-light-source units are presented by scroll control and if the images provide binocular parallax, the images can be perceived as stereoscopic images by the viewer. Hereinafter, basic principles of the present invention will be explained.

Figure 2:
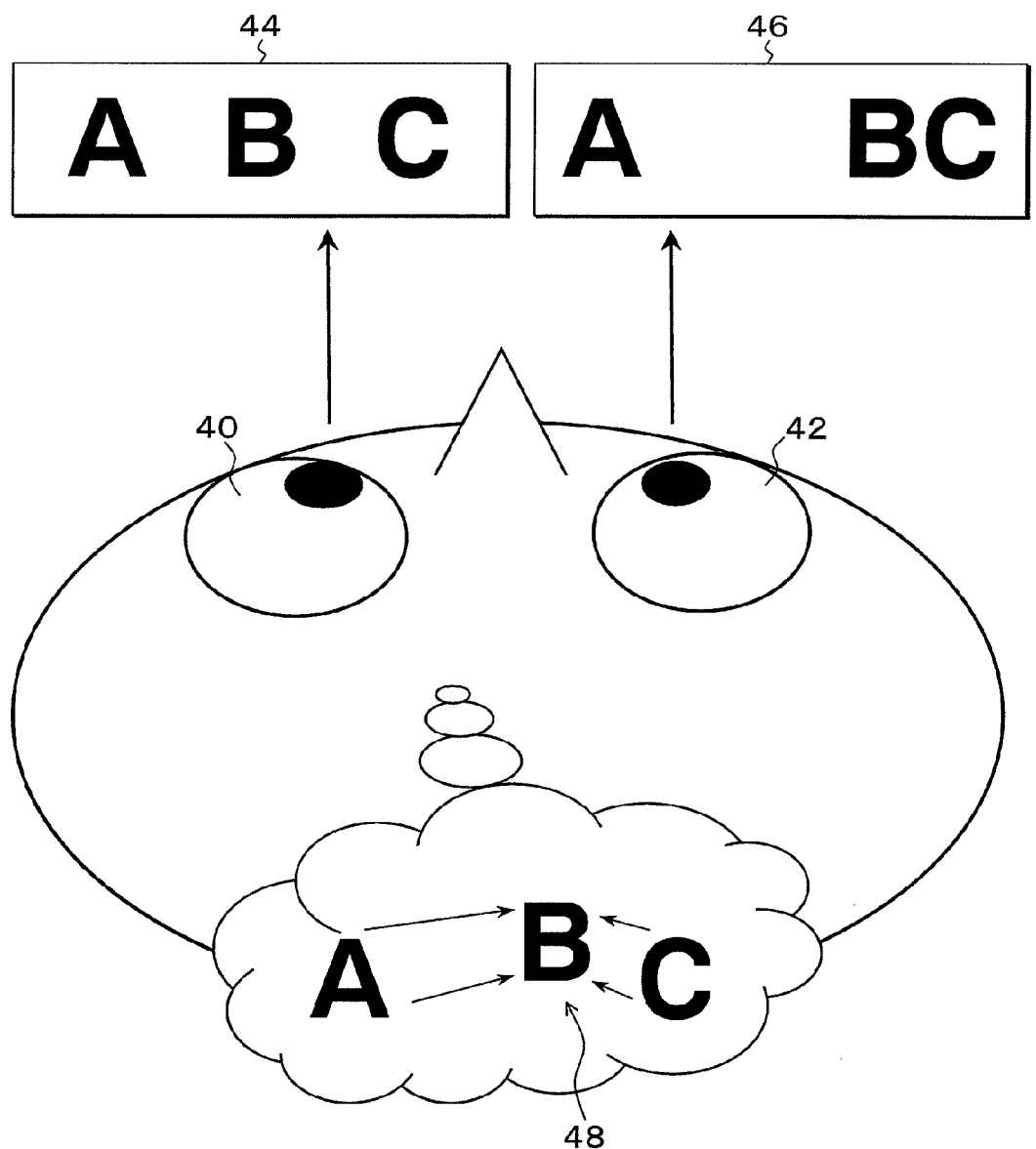
FIG. 2 is a drawing explaining perception of three-dimensional images using binocular parallax.

FIG. 2 is a drawing explaining perception principles of three-dimensional images using binocular parallax. Characters "A, B, and C" will be explained as examples. In FIG. 2, a left eye 40 is assumed to be perceiving an image 44. Also, a right eye 42 is assumed to be perceiving an image 46. In this case, the image 46 perceived by the right eye 42 is different from the image 44 perceived by the left eye 40 in that the position of the character "B" is shifted to the right side. As a result, since the images perceived by the both eyes are mutually different, an image 48 sensed by the brain stereoscopically becomes a three-dimensional image. This is the principle for displaying a three-dimensional image by binocular parallax.

Figure 3A:
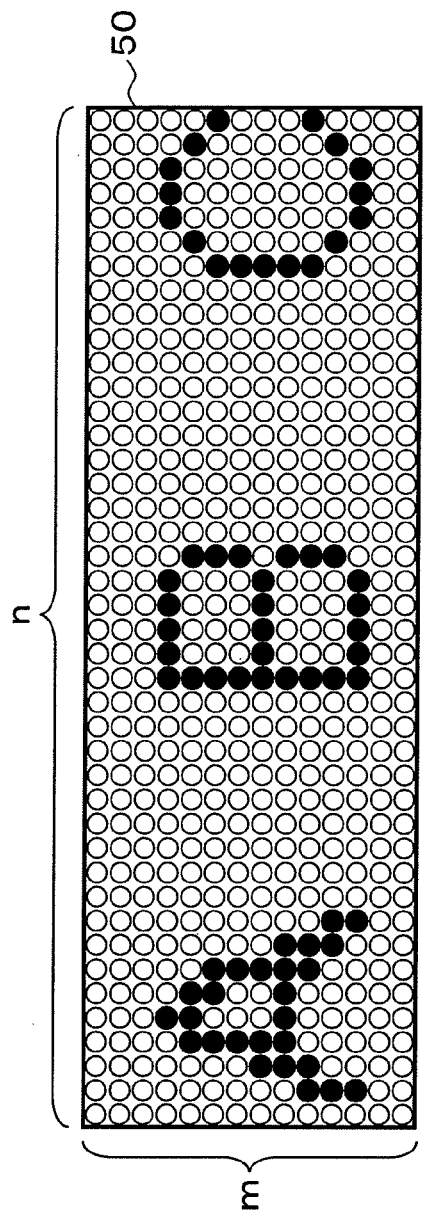
FIGS. 3A and 3B are drawings for explaining the images presented to the left eye and the right eye as matrix images.
Figure 3B:
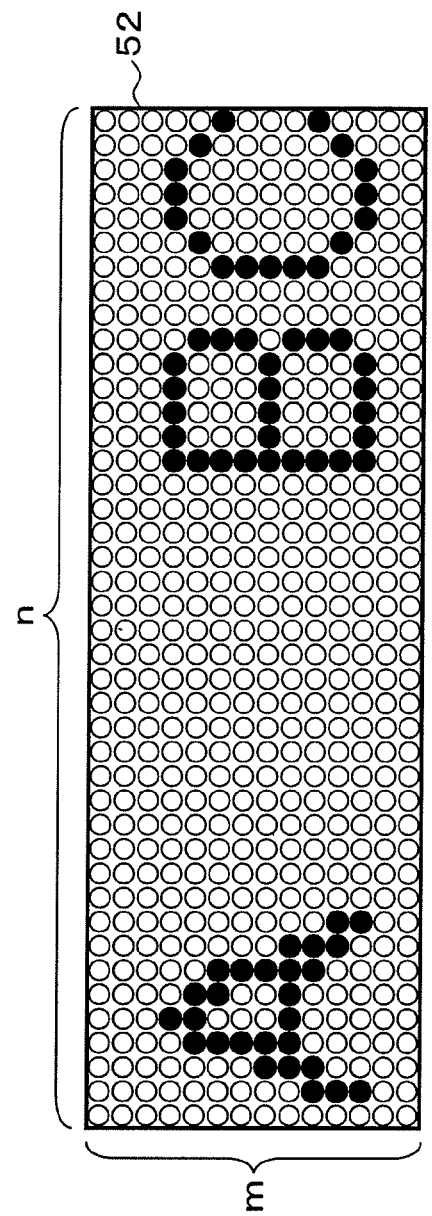

FIGS. 3A and 3B show examples in which characters perceived by the left eye and the right eye are shown in matrices in drawings. Each screen shows characters "A", "B", and "C" in the m×n matrix composed of m row elements and n column elements. Normally, an image processed by a computer or the like is a discrete digital image, and the display thereof is carried out so that elements of the matrix correspond to point light sources. Each point shown by a circle in FIGS. 3A and 3B represents an individual matrix element. FIG. 3A shows a matrix image 50 of the left eye, and FIG. 3B shows a matrix image 52 of the right eye. In this manner, display elements, i.e., point light sources corresponding to the pixels decomposed as matrices are basically required to correspond to the left and right eyes for displaying an overall image. Therefore, whether the overall image can be expressed or not while reducing the number of the point light sources becomes an issue, and there is a technique disclosed in Japanese Patent Application Laid-Open (kokai) No. H8-179717 for two-dimensional display. This technique thins and extracts column-direction matrix columns of two-dimensionally-disposed display elements of matrices and apparently realizes two-dimensional display of the all the matrices by scrolling images.

Figure 4A:
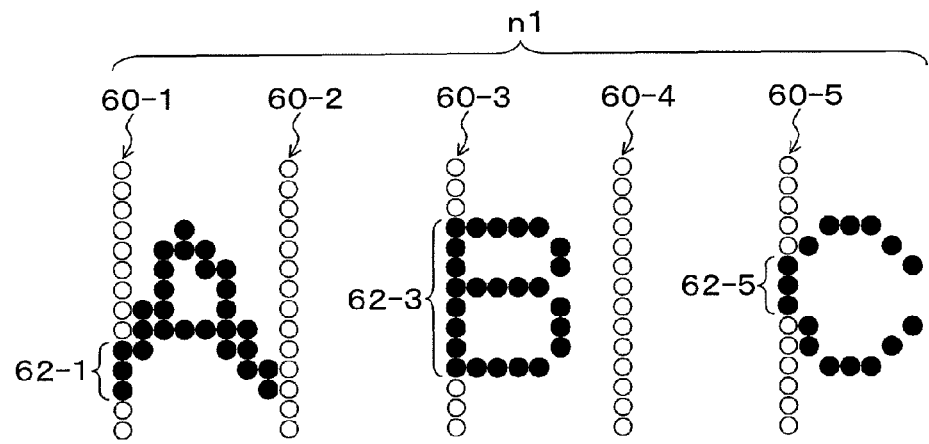
FIGS. 4A, 4B, and 4C are drawings explaining an image scrolling method of the case in which column elements are thinned in the matrix display presented to the left eye.
Figure 4B:
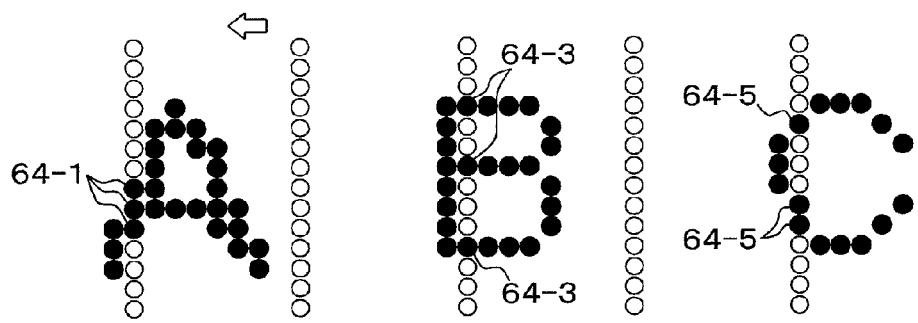
Figure 4C:
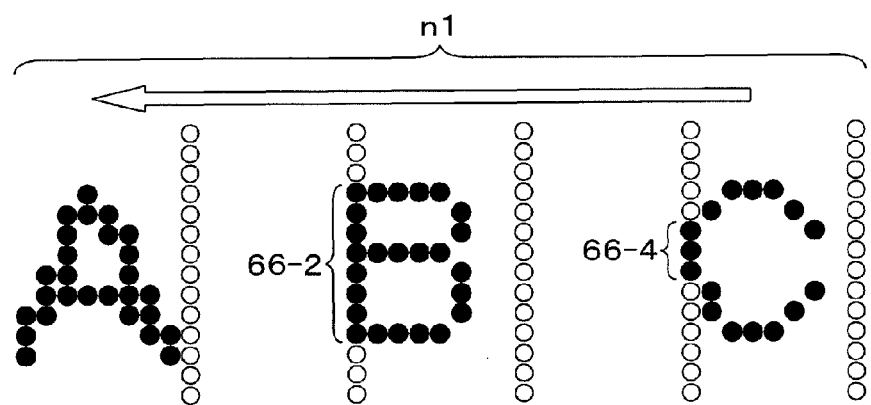

FIGS. 4A, 4B, and 4C are drawings for explanation taking matrix images of the left eye shown in FIG. 3A as examples.

FIG. 4A is a drawing in which characters "A", "B", and "C" to be displayed are allocated to point-light-source columns 60-1 to 60-5 having only thinned column elements. Blinking of point light sources in the point-light-source columns 60-1 to 60-5 emits light when the character elements are allocated thereto. For example, regarding "A", as shown in the drawing, three point light sources 62-1 in the point-light-source column 60-1 emit light. Regarding the character "B", a plurality of point light sources 62-3 in the point-light-source column 60-3 emit light. Regarding the character "C", a plurality of point light sources 62-5 in the point-light-source column 60-5 emit light. At this moment, none of the matrix elements of the characters "A", "B", and "C" other than the matrix elements that are allocated to the point light sources is displayed. Then, as shown in FIG. 4B, after a certain period of time, the elements are shifted only by one dot, in other words, scrolled with changed display time to allocate the matrix elements of "A", "B", and "C". Consequently, regarding the character "A", a plurality of point light sources 64-1 in the point-light-source column 60-1 emit light. Also regarding the characters "B" and "C", similarly, a plurality of point light sources 64-3 in the point-light-source column 60-3 and a plurality of point light sources 64-5 in the point-light-source column 60-5 emit light to correspond to the matrix elements scrolled by one dot. Furthermore, similarly, the matrix elements of one column are sequentially displayed each time with a certain time interval, and the state in which the elements are scrolled by one character is shown in FIG. 4C. In this case, none of the matrix elements of the character "A" is displayed, a plurality of point light sources 66-2 in the point-light-source column 60-2 emit light in the character "B", and a plurality of point light sources 66-4 in the point-light-source column 60-4 emit light in the character "C". In this manner, regarding the matrix elements of n columns, scrolling is carried out in the direction of the arrows shown in FIG. 4B and FIG. 4C while emitting light by the thinned and allocated point light sources to carry out display while moving the entire information. When the matrix elements of the n columns are scroll-displayed by the thinned column elements at a certain speed, a man senses by the brain the light of the part that is not visible at a certain moment between the column light sources, complements the light, and views that. By utilizing this phenomenon, even when part of column elements are displayed by a small number of elements, i.e., thinned column elements, they are perceived as if all the matrices are displayed because of the complementation effect caused by perception of the man, and the entirety of the characters "A", "B", and "C" being moved by scrolling is perceived.

Figure 5A:
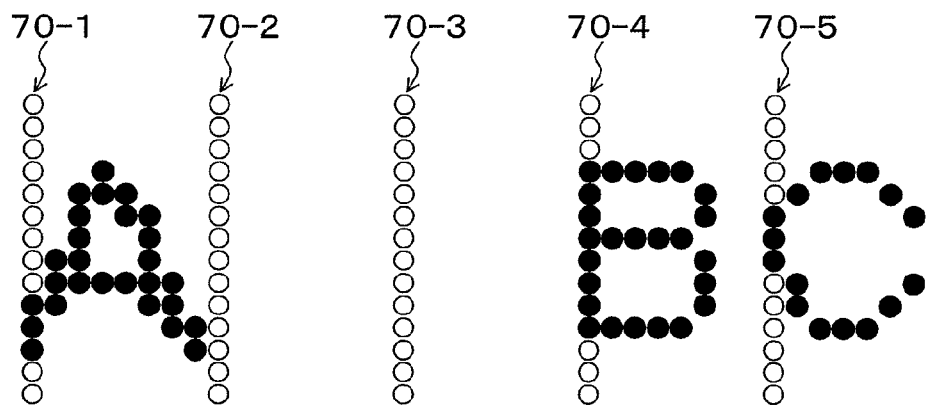
FIGS. 5A, 5B, and 5C are drawings explaining an image scrolling method of the case in which column elements are thinned in the matrix display presented to the right eye.
Figure 5B:
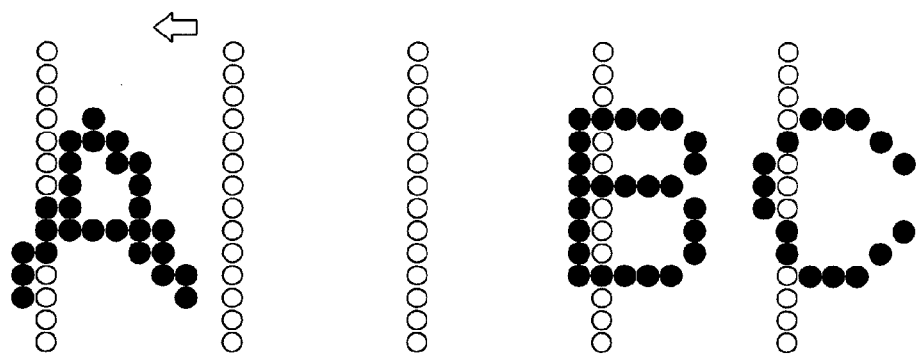
Figure 5C:
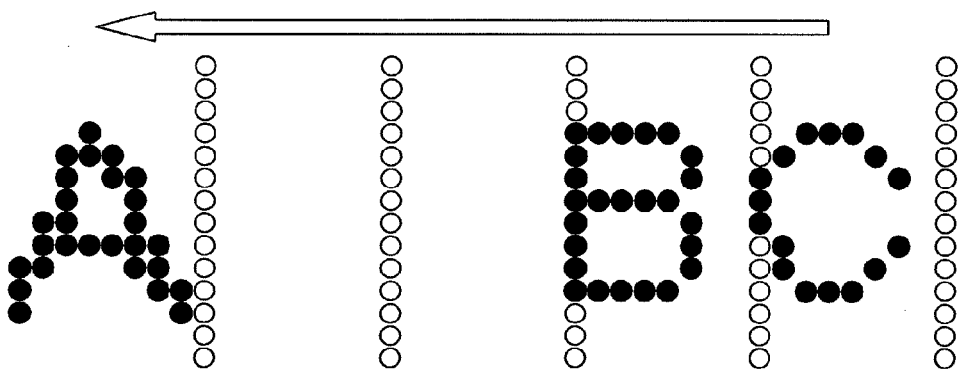

FIGS. 5A, 5B, and 5C show drawings in which the characters "A", "B", and "C" of the matrices to be view by the right eye are allocated to display elements. The character "B" is shifted with respect to the viewed image of the left eye. However, the operating principle is the same as that of the left eye, and the drawings are in the state in which the matrix elements of n columns are scrolled at a certain speed by point-light-source columns 70-1 to 70-5. The techniques for displaying the entirety by the small number of display elements have been explained above. However, in order to present three images, images cannot be perceived as three-dimensional images unless presenting mutually-different image information to the left and right eyes as explained by FIGS. 4A to 4C and FIGS. 5A to 5C. Therefore, a new method of displaying three-dimensional images wherein a line light source is rotated has been invented. Hereinafter, the present invention will be explained in terms of principles with comparison, wherein a parallax barrier method and a light-ray reproducing method are taken as examples.

Figure 6:
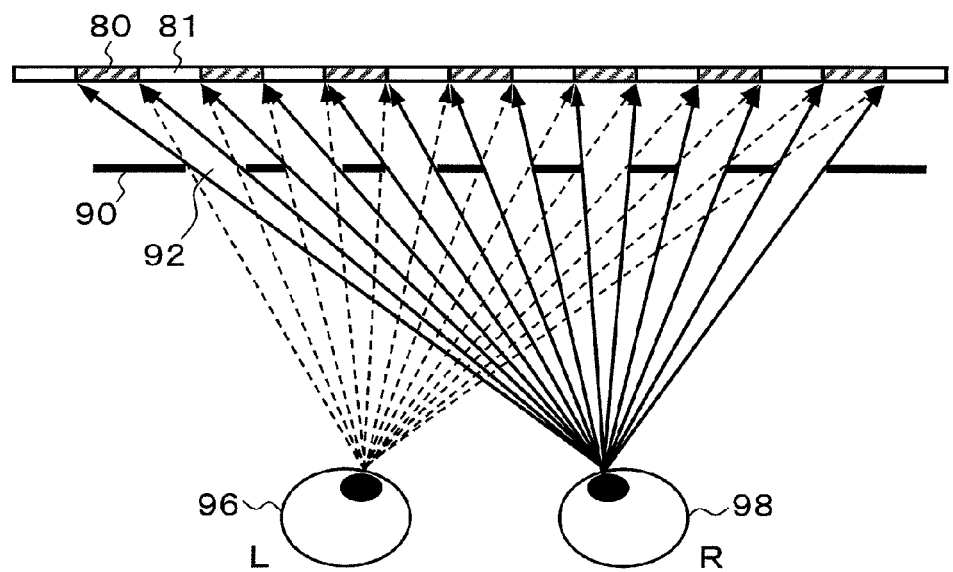
FIG. 6 is a drawing explaining stereoscopic viewing by a parallax barrier method of a two-point-view method.

FIG. 6 shows a basic principle of the parallax barrier method that enables stereoscopic viewing. The basic principle is that the image elements to be viewed by the left and right eyes are different, and this method alternately places image elements and presents mutually different images to the left and right eyes through slits. In FIG. 6, the right eye R98 sees an image element 80 from an opening 92. The left eye L96 sees an image element 81 through an opening 92, but cannot see the image 80 for the right eye because of a barrier 90. Similarly, when image elements which can be seen by the left and right eyes are alternately disposed to display images, different images can be seen by the left and right eyes from the juxtaposed openings. In this manner, the images to which binocular parallax is imparted are viewed, and the brain perceives them as three-dimensional images. In this case, the three-dimensional images can be perceived only at the positions where the positions of both eyes are determined, and this is called a two-eye type. Furthermore, in order to make three-dimensional images be perceived even when the positions of the eyes are changed, different images have to be displayed when viewed from one opening with changed directions. For this purpose, the opening has to be narrowed.

Figure 7:
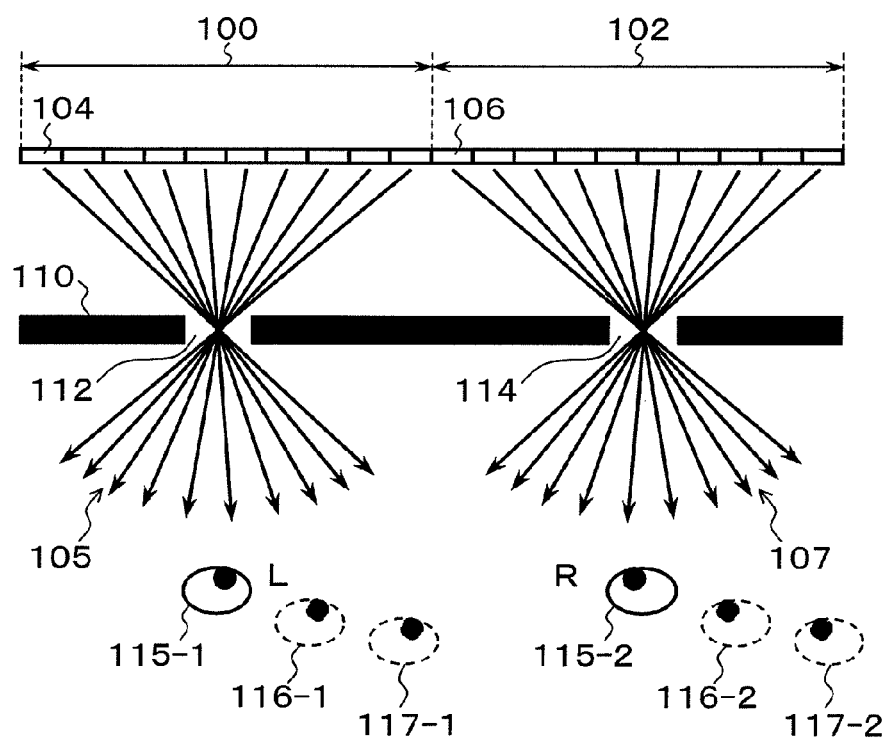
FIG. 7 is a drawing explaining a stereoscopic viewing by a parallax barrier method of a multipoint-view method.

FIG. 7 shows the state when different images are configured to be viewed from one opening. For example, an opening 112 is set in a parallax barrier 110 so that a pixel 104 obtained by dividing one pixel 100 into images viewed from the directions of different viewpoints can be seen by the left eye only from one direction 105 and that the pixels can be seen from the directions corresponding to the number of division. Similarly, an opening 114 is set so that a pixel 106 obtained by dividing one pixel 102 into images viewed from the directions of different viewpoints can be seen by the right eye only from one direction 107 and that the pixels can be seen from the directions corresponding to the number of division. Therefore, three-dimensional images can be seen from many positions. In principle, the positions can be changed depending on the number of the divided pixels. For example, in FIG. 7, the positions are: the positions of a left eye 115-1 and a right eye 115-2, the positions of a left eye 116-1 and a right eye 116-2, and the positions of a left eye 117-1 and a right eye 117-2. This method has a plurality of positions viewable as three-dimensional images and called multipoint-view method. The parallax barrier method is a technique in which, basically, an opening which allows transmission of light is provided in light-shielded space and placed in front of a two-dimensional image, and images different depending on viewpoints are presented when the image is observed through the opening. In this case, it is also possible to present the two-dimensional image utilizing the afterimage effect by scanning a light source with respect to the opening while blinking light at high speed instead of the two-dimensional image. This is a method called the light-ray reproducing method.

Figure 8:
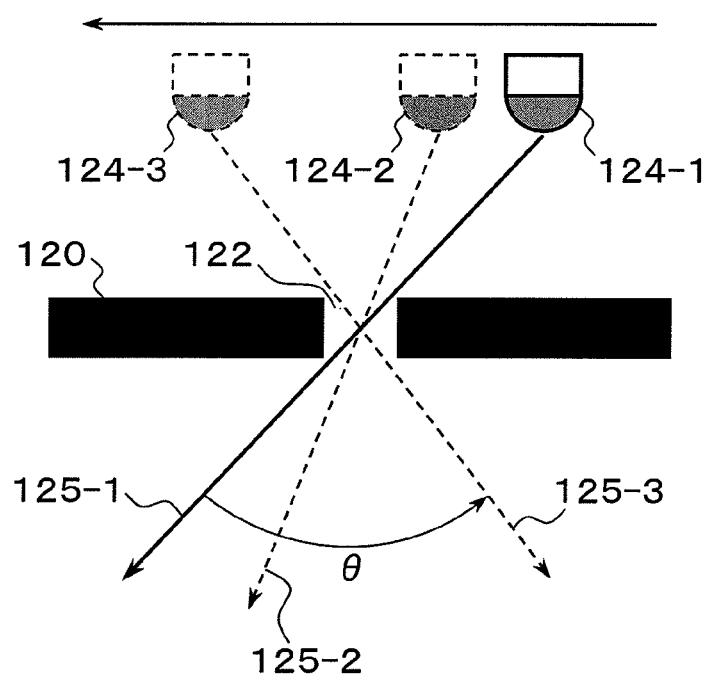
FIG. 8 is a drawing explaining a method of presenting images from different directions by light-source scanning.

FIG. 8 is a drawing for explaining a method of presenting a two-dimensional image by scanning of a light source. In FIG. 8, an opening 122 having a sufficiently narrow opening width is provided in a barrier 120. When the light source 124-1 emits light at this position, light is emitted in the direction of a light ray 125-1. Then, the light source is scanned to emit light at the position of a light source 124-2, light is emitted in the direction of a light ray 125-2. When light is emitted at the position of a light source 124-3, at which emission through the opening 122 reaches a limit, by further scanning the light source, light is emitted in the direction of a light ray 125-3. The scanning direction θ of the light rays from the opening is determined by the range of light emission from the positions of the light source 124-1 and the light source 124-3. The number of parallax is determined depending on the number of angle division number of the scanning angle.

Figure 9:
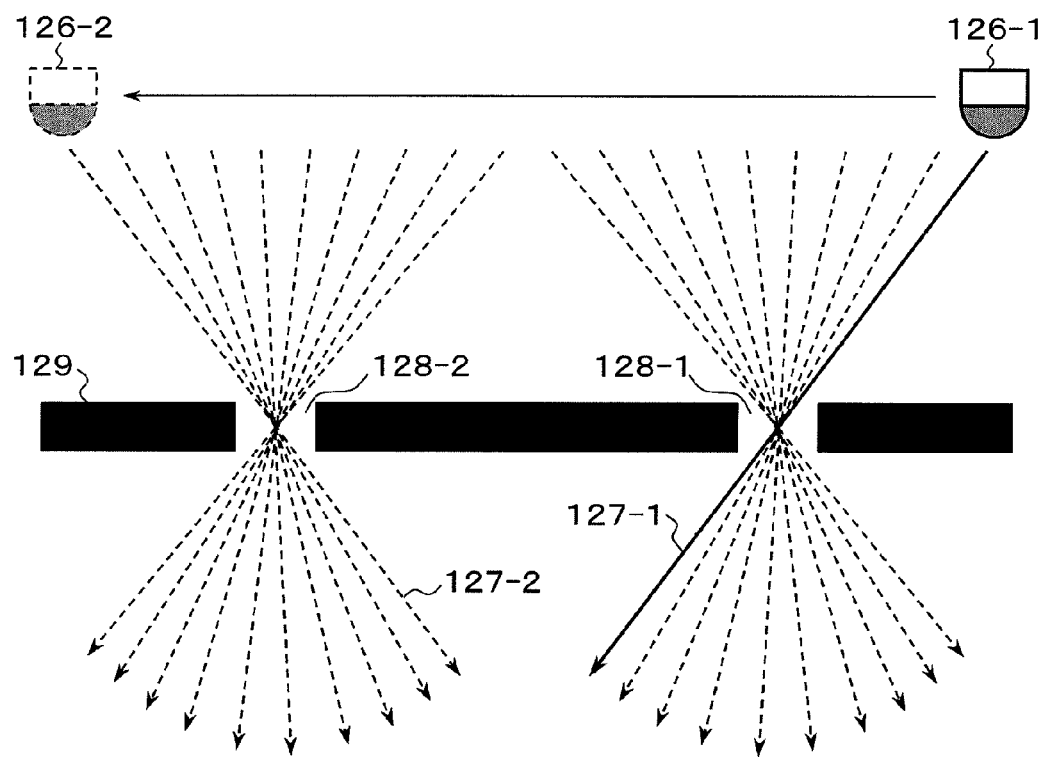
FIG. 9 is a drawing explaining the principle of a light-ray reproducing method.

FIG. 9 is a drawing explaining the state of emitting light rays by scanning of a light source from an opening 128-1 and an opening 128-2 provided in a barrier 129. It is assumed that a point light source 126-1 is scanned to the position of a light source 126-2. First, light is emitted at the position of the light source 126-1 to emit light in the direction of a light ray 127-1.

Furthermore, when the light source is scanned to emit light by the light source at certain timing, an image presentation system of the multipoint-view method as shown in FIG. 7 is obtained. If the light source is a point-light-source column having a plurality of light sources arranged on a straight line, three-dimensional images can be presented, and the light-ray reproducing method is a method suitable for image processing by a computer or the like. The parameters which affect image quality such as resolution and the number of parallax of the light-ray reproducing method are determined by the geometric relation of a device. Particularly, the horizontal resolution, i.e., pixel pitch is determined by the pitch of openings, wherein the diffraction phenomenon of light appears when the openings are narrowed, and there is a limit for narrowing the opening width. Therefore, since the angle θ operated from one opening is also limited, the number of parallax expressing images in multipoint views cannot be increased. Therefore, the present invention proposes a technique in which a light source is placed at the position of the opening 122 in FIG. 8, an opening is provided at the position opposed thereto, and the light source and the opening are rotated to rotate the direction of the light ray around the 360 degrees.

Figure 10:
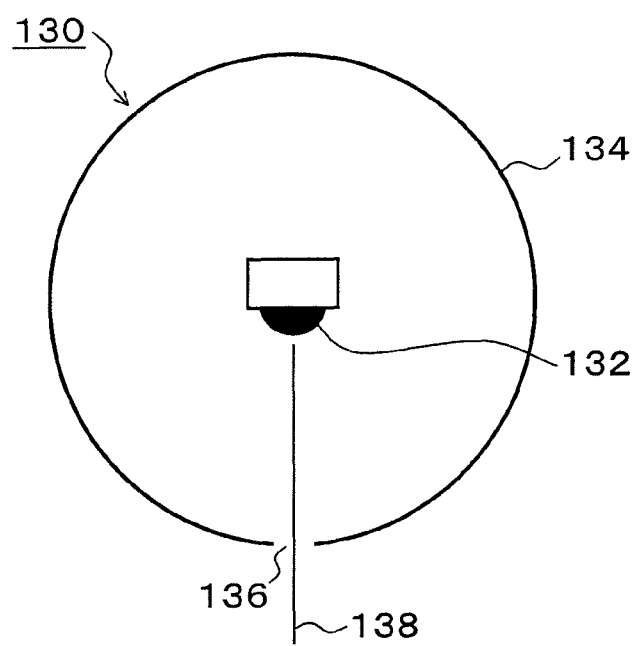
FIG. 10 is a drawing explaining a basic configuration of a line-light-source unit according to the present invention.

FIG. 10 is a drawing explaining a basic unit structure of the present invention by using one light source. In FIG. 10, in a light source unit 130, a light source 132 is disposed at the center of rotation, a cylindrical light shield 134 is installed on the isoperimetric surface opposed to the front of the light source 132, and a narrow opening 136 is provided at the position at which the light source 132 is opposed to the light shield 134. When the light source 132 emits light, a light ray 138 that passes through the opening 136 becomes a light ray having directionality and is emitted in one direction.

Figure 11:
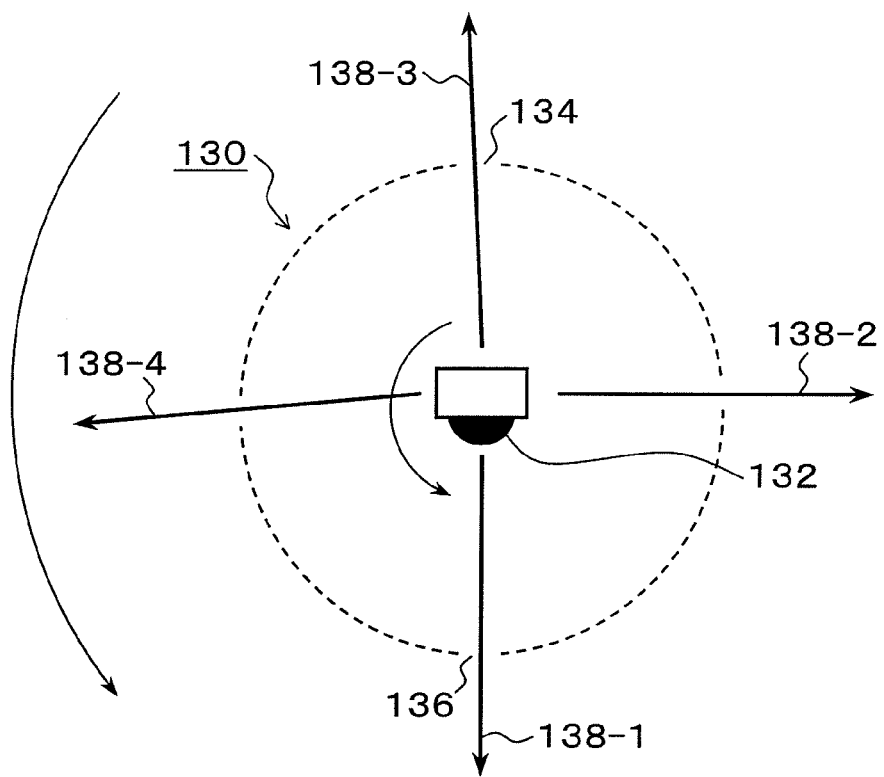
FIG. 11 is a drawing explaining the state of emission of light rays from different angles by a light source which rotates in the present invention.

FIG. 11 is a drawing showing the directions of light rays of the case in which the light source unit 130 shown in FIG. 10 is rotated in the manner that the light source 132 and the opening 136 are integrated. When the opening 136 is rotated in the direction shown by an arrow in FIG. 11, the light source 132 and the opening 136 move on a concentric circle about a rotation axis depending on the angle of rotation. In this process, when the light source emits light depending on the angles thereof, light rays are emitted in the directions corresponding to the angles, respectively. For example, light is emitted in the directions of light rays 138-1, 138-2, 138-3, and 138-4 by the rotation of the light source unit 130. Since the part other than the opening 136 shields light by the light shield 134, the light rays have directionality. Therefore, when the intensity of light is controlled to be modulated depending on the directions of the light rays, different light can be emitted depending on the viewing directions.

FIG. 12A is a specific example of a line-light-source element 140, wherein a plurality of point light sources are linearly arranged to serve as a point-light-source column 142. FIG. 12B is a specific example of a rotary line-light-source unit 144. The isoperimetric surface of the line-light-source element 140 is surrounded by a cylindrical light shield 146, and a long and thin slit-shaped opening 148 is provided at the position opposed to the point-light-source column 142. Hereinafter, the long and thin slit-shaped opening will be simply referred to as a slit. When the line-light-source unit 144 is rotated in the manner that the line-light-source element 140 and the slit 148 are integrated to emit different light depending on the angle of rotation, one-dimensional information can be presented for every certain angle. The line-light-source unit 144 corresponds to one opening in the light-ray reproducing method explained in FIG. 8; however, since different images can be presented depending on the angles of rotation, different images can be presented in the full-circle directions of 360 degrees, and the number of parallax can be increased since there is no restriction on the scanning angle like the light-ray reproducing method. As an actual example, it was realized by an LED array, and a line-light-source element in which 128 point light sources are disposed in the vertical direction in a width of 64 cm was used. The diameter of the light shield was 100 mm, and the width of the slit was 1 mm. The diameter of the isoperimetric surface of the slit is 100 mm, and the perimeter length becomes about 314 mm; therefore, different images can be presented respectively for about every one degree of the rotation angle in terms of principle.

Figure 13A:
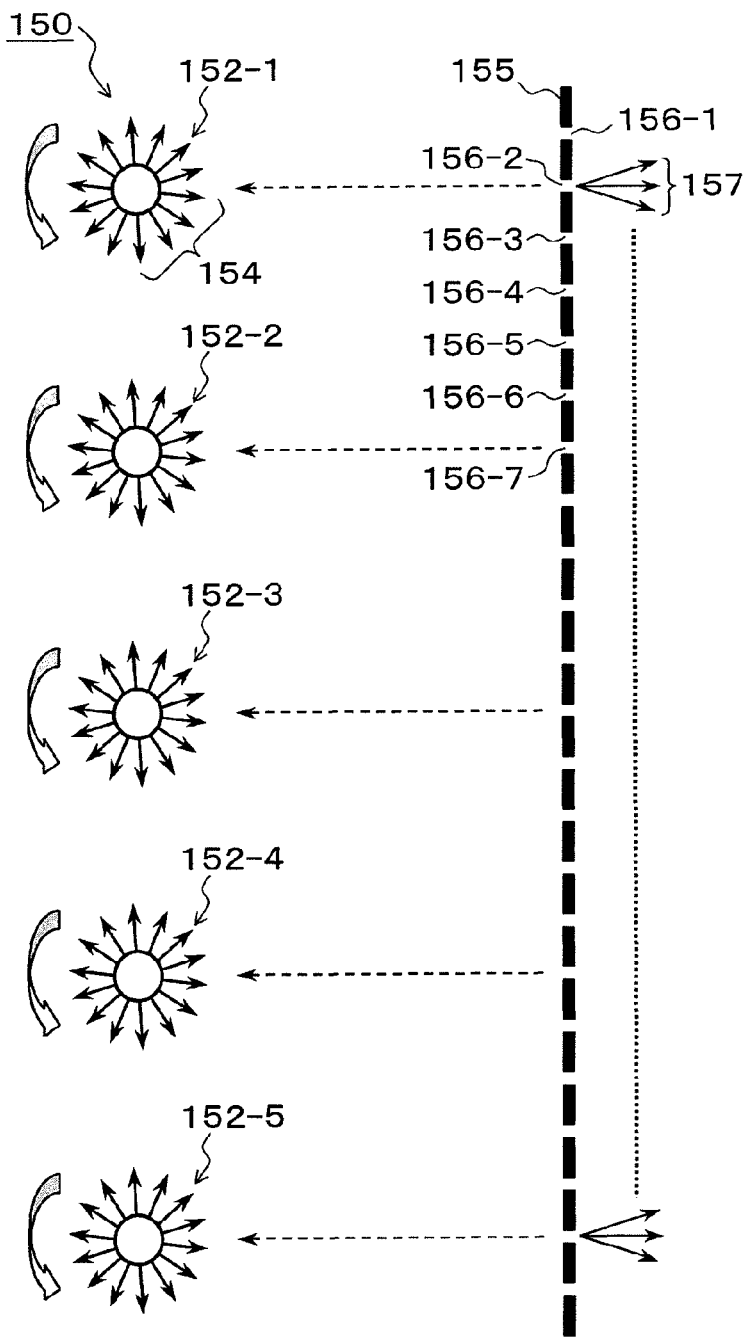
FIGS. 13A and 13B are drawings explaining a three-dimensional information presenting device, wherein a plurality of rotary line-light-source elements of the present invention are disposed and compared with a conventional light-ray reproducing method.
Figure 13B:
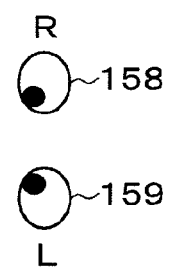

FIG. 13A is a schematic drawing of a light source unit in which a plurality of line-light-source units 152-1 to 152-5 are juxtaposed to constitute a three-dimensional image presentation device 150 of the present invention. The line-light-source units 152-1 to 152-5 are rotated in synchronization; and, for example, from the line-light-source unit 152-1, light rays 154 are emitted in different directions depending on the angles of rotation. In order to understandably explain the arrangement of the line-light-source units 152-1 to 152-5, a conventional parallax barrier method is shown in FIG. 13B. In FIG. 13B, a plurality of openings are in a barrier 155, and images (not shown) are disposed so that different images are presented respectively from the openings depending on the viewed directions. In the light-ray reproducing method, light is emitted in different directions by scanning of a light source (not shown) instead of the images. For example, light rays 157 are emitted from the opening 156-2 by the scanning light source (not shown). The light from the plurality of openings causes a viewer to view different images by the right eye 158 and the left eye 159, thereby perceiving the images as three-dimensional images by the sensing effect of the brain. In the positional relation of the line-light-source units according to the present invention and the openings of the parallax barrier method or the light-ray reproducing method, as is apparent from the comparison of FIG. 13A and FIG. 13B, the line-light-source units and the openings of the parallax barrier method do not correspond to each other one-to-one. For example, the line-light-source unit 152-1 corresponds to the opening 156-2, and the adjacent line-light-source unit 152-2 corresponds to an opening 156-7. Therefore, openings 156-3 to 156-6 are thinned. Therefore, since only the image information displayed by the line-light-source units 152-1 to 152-5 is presented at a certain moment, the image information is also thinned, and only part of the entirety is presented. However, as explained by FIGS. 4A to 4C, when one-dimensional images of a plurality of line-light-source units are sequentially subjected to scroll display at a certain speed, even when the images are momentarily thinned, the complementation effect by virtue of the sense of the human being works, and the images are viewed as if all the image information is presented. Furthermore, since different images are presented by the angles of the line-light-source units, different images having parallax are viewed by the both eyes. As a result, the viewer perceives the images as three-dimensional images by the sensing of the brain. An image control unit controls the image information so as to carry out control that as if the entire three-dimensional images can be viewed as moving images by scrolling.

Figure 14:
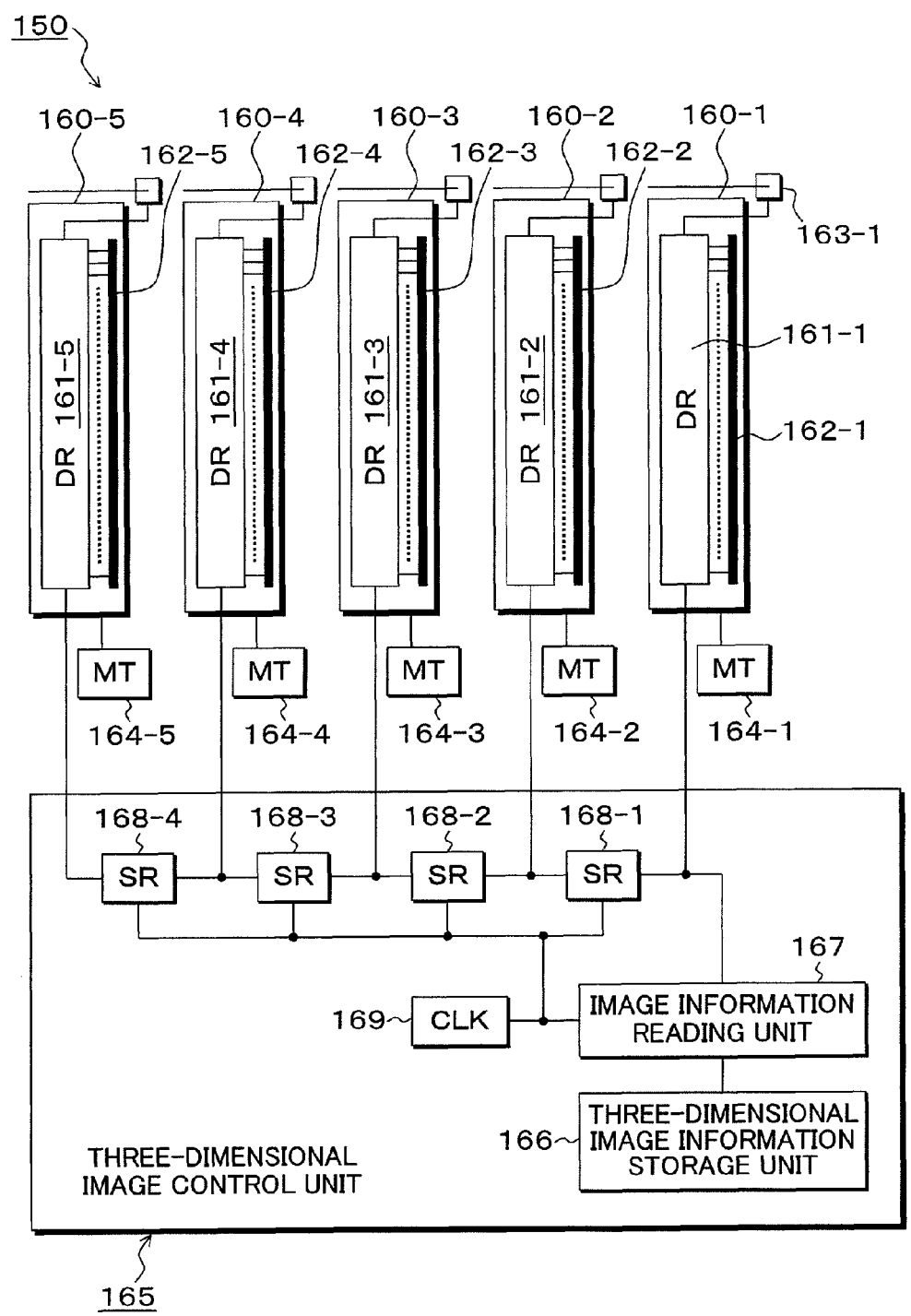
FIG. 14 is a block diagram including an image control unit of a plurality of rotary line-light-source units of the present invention.

FIG. 14 is a block diagram of a three-dimensional image presentation device 150 according to the present invention. A basic configuration includes: a plurality of line-light-source units 160-1 to 160-5; motor units 164-1 to 164-5 having, for example, pulse motors and motor drivers which rotates the line-light-source units while synchronizing them; and a three-dimensional image control unit 165. The line-light-source units 160-1 to 160-5 further have driver circuits 161-1 to 161-5 which drive point-light-source columns 162-1 to 162-5 to carry out light-emission drive of light. The driver circuits 161-1 to 161-5 include latch units of image information, which instruct blinking of light to correspond to point light sources, and shift registers, which shift one-dimensional information of the point-light-source columns to the latch units, wherein the image information different depending on the angle of rotation is presented. Synchronization of the angles of rotation is carried out by detecting synchronization signals by a rotation-angle synchronization signal detecting unit 163-1 combining a light-emitting element and a light-receiving element with a rotary encoder. The line-light-source units 160-2 to 160-5 also have similar configurations. Blinking of the light sources emits light with the light intensity changed by modulation. The three-dimensional image control unit 165 is composed of: a three-dimensional image information storage unit 166, which stores three-dimensional image information; an image information reading unit 167, which reads the image information from the three-dimensional information storage unit 166; shift registers 168-1 to 168-4; and a clock unit 169 serving as the synchronization signals. The image information is composed of an element image in which each pixel is continued by the number of presented different images of the line-light-source unit, and three-dimensional information entirety information is stored in the storage unit 166. The image information reading unit 167 reads the image information to be presented to one of the line-light-source units and, first, transmits the image signal thereof to the line-light-source unit 160-1. Since the driver circuit 161-2 is provided with the shift register and the latch circuit, the image information respectively corresponding to the plurality of point light sources is latched, synchronization is carried out by the synchronization signal of the rotary encoder, and the light of the image information is emitted by the point light sources in accordance with the angle of rotation. In this process, the one-dimensional image presented for each angle serves as the image that provides parallax. Since the line-light-source unit presents thinned image information, with respect to the next line-light-source unit 160-2, the line-light-source unit transmits the image information, which is delayed by the amount of thinning, to the line-light-source unit 160-2. The delay is made by the shift register 168-1. Similarly, the signals of the image information are delayed by the shift registers 168-2 to 168-4 and given to the line-light-source units 160-3 to 160-5, thereby presenting images from different directions by rotation of the line-light-source units. The image reading unit 167 reads the stored image information one after another and transmits the image signals thereof to the line-light-source units 160-1 to 160-5 to transmit the entirety of the three-dimensional images. In presentation of the thinned entire three-dimensional image, the entirety is perceived as a moving three-dimensional image because of the complementation effect caused by scrolling. As the three-dimensional image information control unit, for example, a program for signal processing can be installed into a personal computer or a desktop computer and executed. The program is stored in, for example, a CD (Compact Disk), which is a computer readable medium, and installed to a hard disk of a computer. The three-dimensional image information may be stored in, for example, a hard disk serving as an internal storage medium of a computer or a CD, DVD (Digital Video Disk), or USB (Universal Serial Bus) memory serving as an external storage medium. Specifically, the number of rotations of the line-light-source unit is 60 rpm. As a result, images of 60 frames per second can be presented. When the images of the respective frames correspond to movement, three-dimensional moving images can be also presented.

Figure 15:
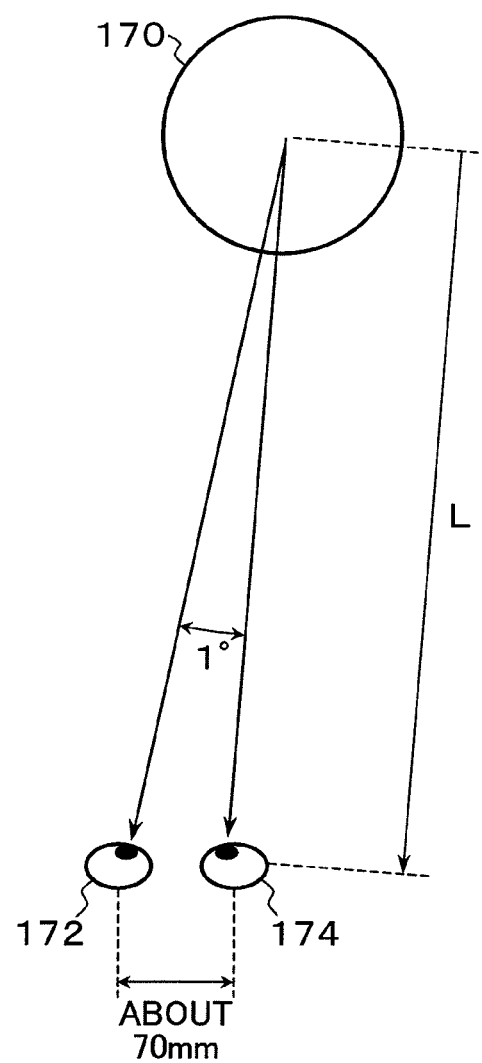
FIG. 15 is a drawing for calculating the distance in the case in which the three-dimensional image presentation device is viewed in the present invention.

FIG. 15 is a drawing for explaining the relation between the viewing distance of a viewer and a multipoint-view region. Generally, it is said that the distance between the left eye 172 and the right eye 174 is about 70 mm; and, when the slit width of the line-light-source unit 170 is 1 mm, different images, i.e., images having parallax have to be presented to the left eye 172 and the right eye 174 at least for each degree, and the viewing distance L becomes about 4 m because of the relation: L×tan 1°=70 mm. Therefore, the range in which multipoint view is achieved is present within the distance of about 4 m, and the three-dimensional images can be perceived within this range.

Second Embodiment

In the first embodiment, the configuration in which both of the line-light-source element and the slit are integrally rotated has been shown in detail. However, the number of the rotating slit is one, and the light source can stand still if light is emitted in the directions of 360 degrees.

Figure 16:
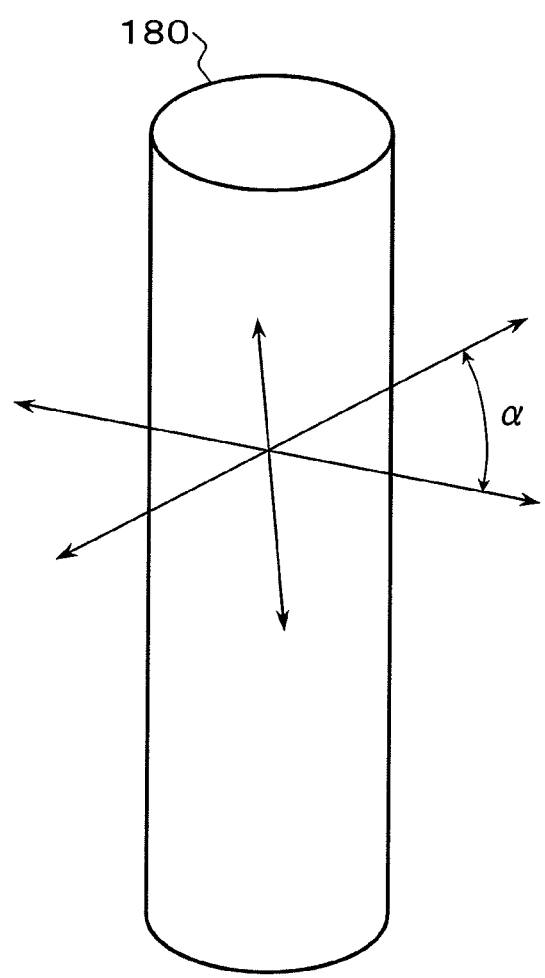
FIG. 16 is a drawing for studying the number of line-light-source units of the case in which light is emitted in full-circle directions.

FIG. 16 is a study drawing for emitting light in the directions of 360 degrees. It is conceived that the isoperimetric surface on which the slit rotates is to be divided into equal angles by an angle α. If α is 180 degrees, two point-light-source columns are required; if α is 120 degrees, three line-light-source elements are required; and, if α is 90 degrees, four line-light-source elements are required. However, although two line-light-source elements are enough for the case in which α is 180 degrees, in reality, the parts of the line-light-source elements have thicknesses, and, on the parallel surfaces of the parts sandwiching the central axis, there are ranges in which light cannot be emitted in the range that is two times the thickness of the parts. Therefore, at least three line-light-source elements are required.

Figure 17:
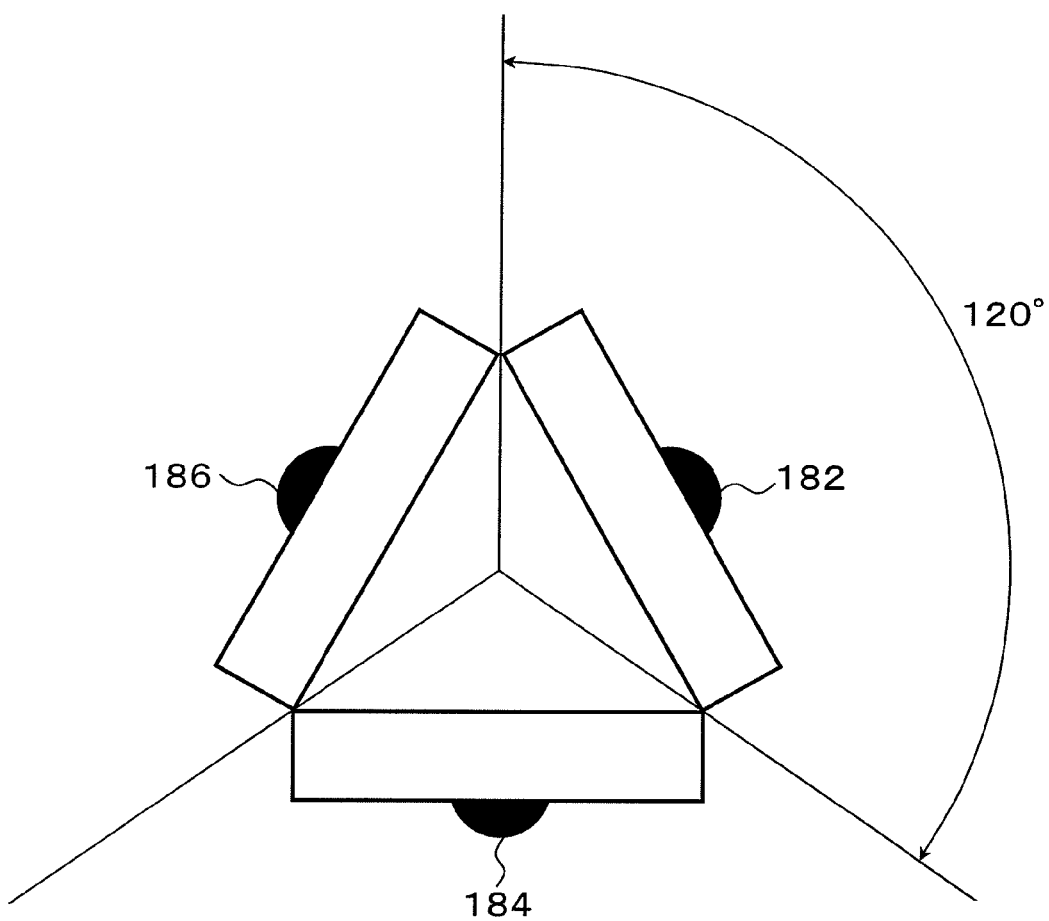
FIG. 17 is a drawing showing the arrangement of the case in which three line-light-source elements are fixed.

FIG. 17 shows an arrangement of the case in which three line-light-source elements are provided. The line-light-source elements 182, 184, and 186 are disposed at the angle of 120 degrees. As a result, light can be emitted in the directions of 360 degrees.

Figure 18:
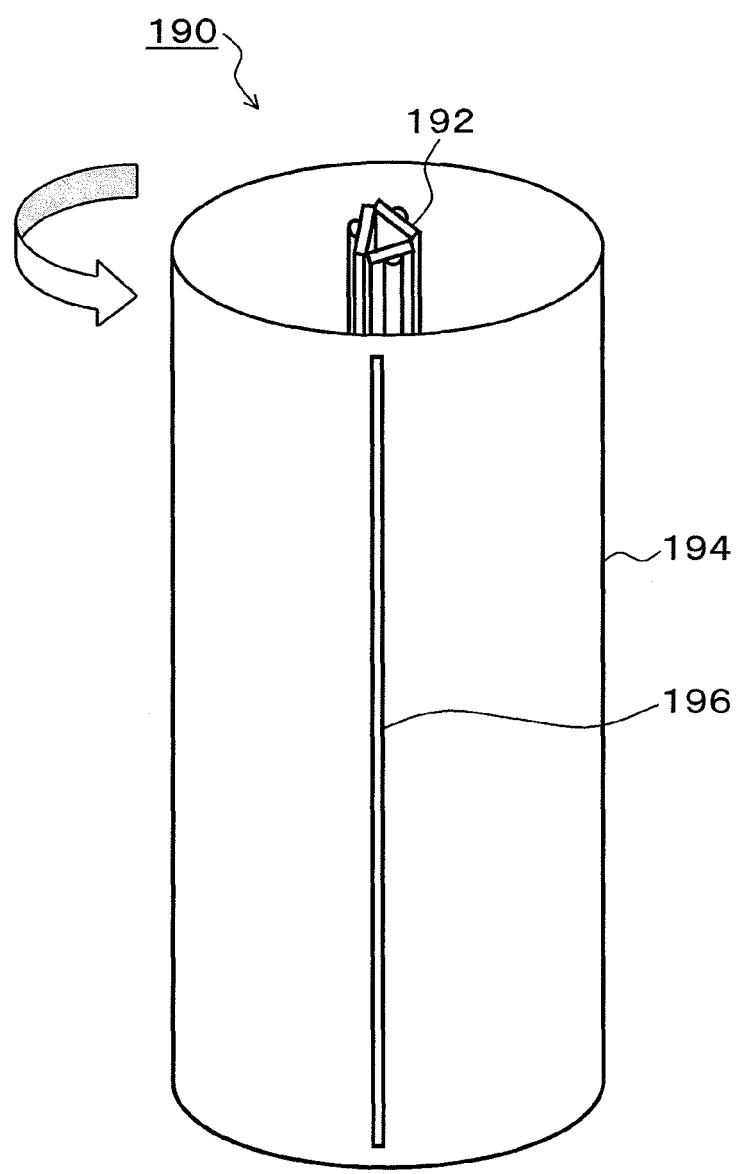
FIG. 18 is a drawing explaining multi-ray light-source units showing three fixed line-light-source elements and a slit.

FIG. 18 shows a line-light-source unit 190 in which three line-light-source elements 192 are used, and a slit 196 is provided in a light shield 194. The light-source unit using the plurality of line-light-source elements is referred to as a multi-ray light-source unit. The multi-ray light-source unit 190 is characterized in that the light source can stand still. Compared with the case in which the light source rotates, there are advantages that signals are not required to be transmitted from a rotating contact unit, noise is not readily generated, and the rotation mechanism becomes simple since only the slit is required to be rotated. Control of image information is similar to the method explained in the first embodiment if distributing signals to the fixed point-light-source columns is added thereto.

Third Embodiment

As an example in which the second embodiment is applied, an embodiment about a method of providing slits so as to correspond to point-light-source columns of line-light-source elements in a multi-ray light-source unit will be explained.

Figure 19:
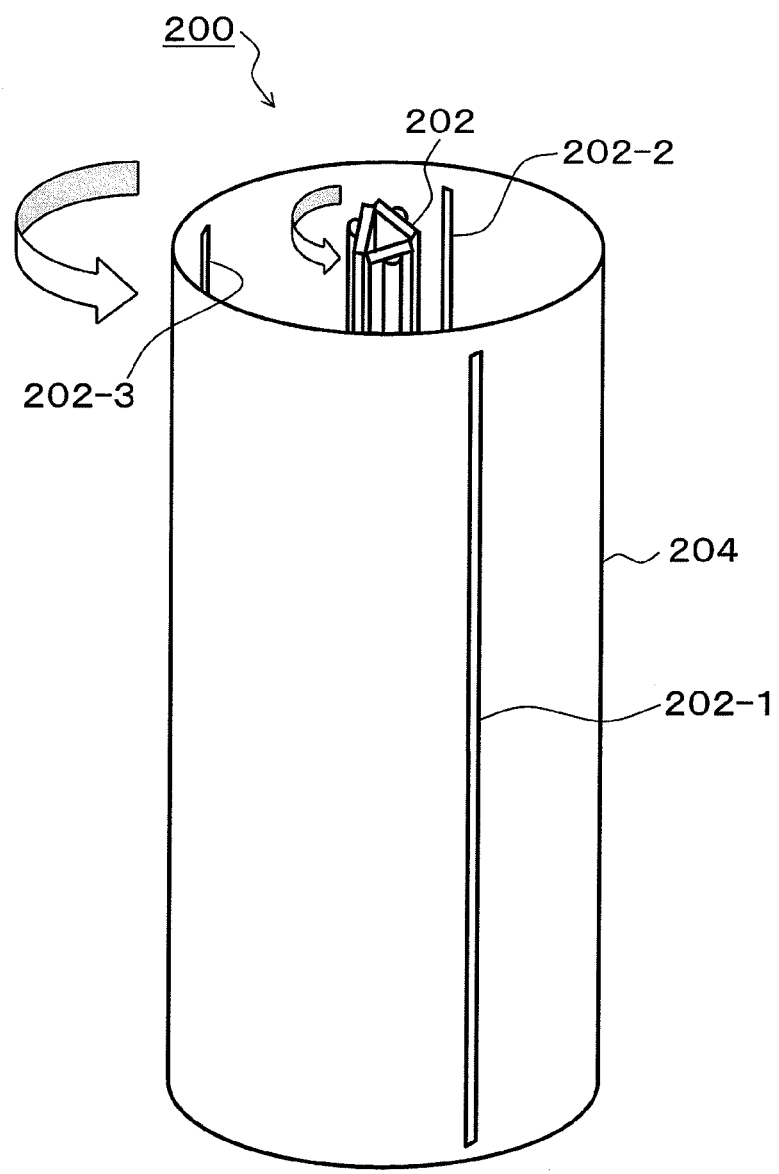
FIG. 19 is an explanatory drawing for explaining a multi-slit line-light-source unit, which is provided with a plurality of slits opposed to a plurality of point-light-source columns, and an application example thereof.

FIG. 19 shows the structure of a line-light-source unit of the case in which three line-light-source elements of a light-source unit 202 are provided, and a light shield 204 is provided with slits 202-1 to 202-3 corresponding to respective point-light-source columns. The light-source unit 200 provided with the slits corresponding to the plurality of point-light-source columns is referred to as a multi-slit line-light-source unit. A basic method of usage of the multi-slit line-light-source unit 200 is rotation of only the slits; however, if the point-light-source columns and the slits are rotated at the same time, light rays multiplied by three are emitted; therefore, the speed of rotation becomes one third compared with the case in which the number thereof is one. In this case, long life can be achieved since the power consumption of a motor is small, and consumption due to friction of an electrical connection part at a rotating unit is small. The most characteristic method of usage of the multi-slit line-light-source unit is a method in which the line-light-source elements and the slits are rotated at the same time to equalize the number of rotations thereof with that of the case of one line-light-source element. In this case, since a three-dimensional image can be presented by the one line-light-source element, for example, three three-dimensional images are synthesized when different three-dimensional images are presented to the second line-light-source element and the third line-light-source element. Furthermore, if the three line-light-source elements are the line-light-source elements having point-light-source columns of red (Red), green (Green), and blue (Blue), which are the three primary colors of light, there is an advantage that color three-dimensional images can be easily realized.

Fourth Embodiment

In order to arbitrarily widen the width of a part constituting a line-light-source element, a point-light-source column has to be widened; however, in reality, there are restrictions in terms of manufacturing techniques and cost, and the number of the point light sources is limited. However, there are many demands for displaying a wide-range three-dimensional images, and, in that case, devices have to be overlapped in the vertical direction. However, the overlapped part cannot display images, and image quality is reduced. A solution means therefor is to overlap seamless point-light-source columns.

Figure 20:
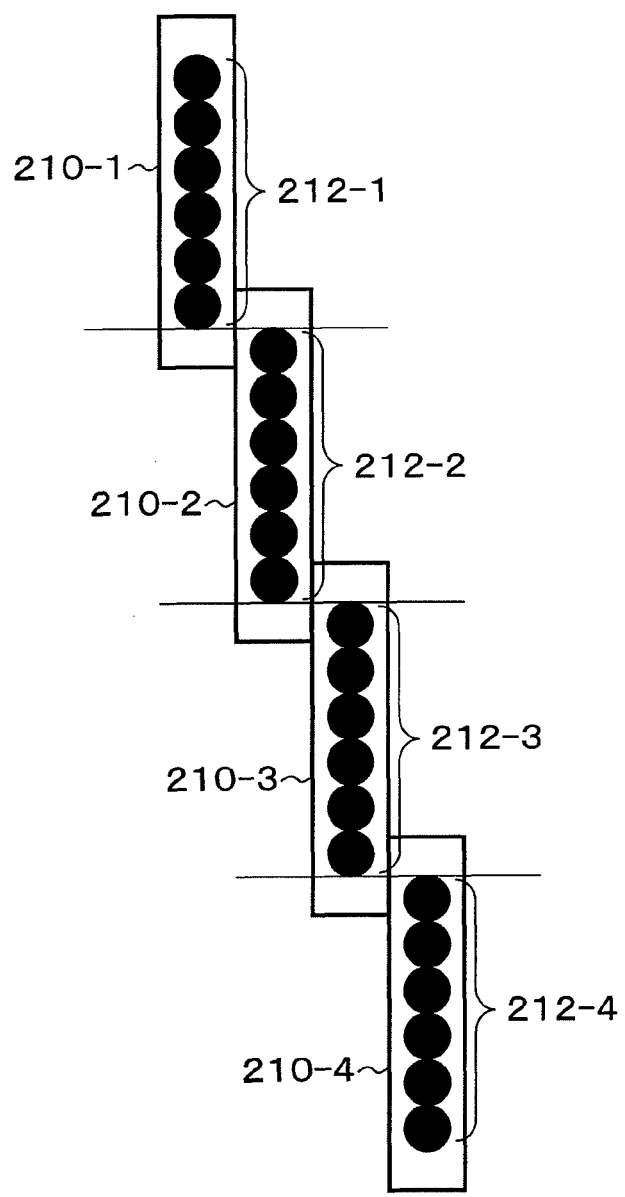
FIG. 20 is a drawing explaining the arrangement of point-light-source columns of the case in which the point-light-source columns are expanded in the vertical direction.

FIG. 20 shows an overlapping method for expanding a point-light-source column composed of a limited number of point light sources. In FIG. 20, line-light-source elements 210-1 to 210-4 are disposed to be mutually shifted in the horizontal direction so that the line-light-source elements 210-1 to 210-4 are positioned smoothly continuously without mutually overlapping point-light-source columns 212-1 to 212-4 in the horizontal direction. This is for the reason that they cannot be linearly disposed since substrates are always sticking out to the top/bottom in the real part configuration of the line-light-source elements. Therefore, the line-light-source elements 210-1 to 210-4 are disposed at an angle of 90 degrees so as to surround the periphery of the rotation axis based on the center of rotation. The disposing angle may be any degree as long as the four point-light-source columns are disposed. The reason therefor is that the columns are only required to be present at any positions when rotated once. The timing for presenting image information is controlled depending on the disposed positions.

Figure 21:
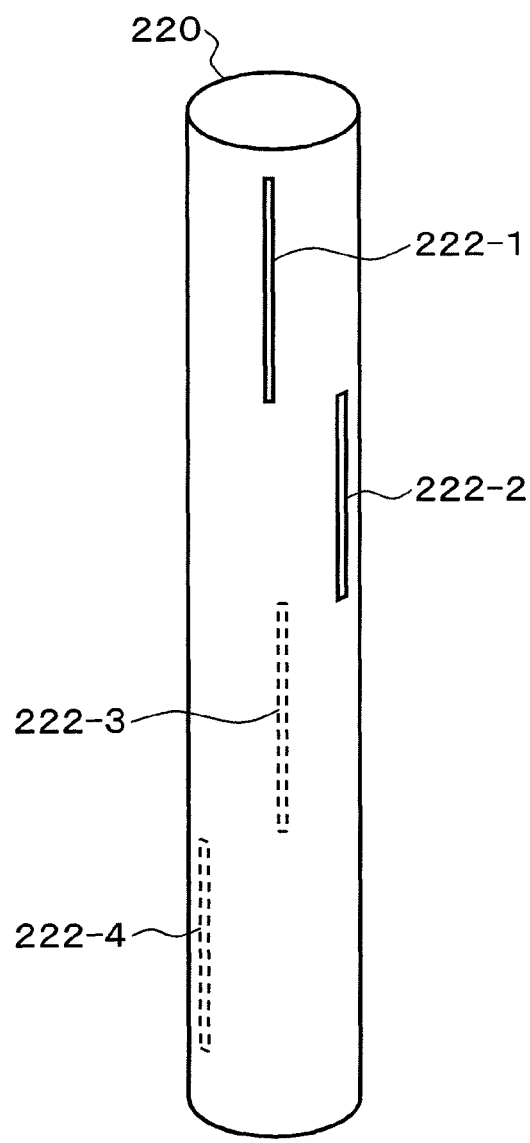
FIG. 21 is a drawing explaining the positions of corresponding slits of the case in which the plurality of point-light-source columns are used and expanded in the vertical direction.

FIG. 21 shows the positional relations of slits 222-1 to 222-4 on the peripheral surface of a light shield 220 corresponding to the line-light-source elements 210-1 to 210-4 disposed according to FIG. 20. The slits 222-1 to 222-4 are provided at the positions opposed to the point-light-source columns 212-1 to 212-4. Then, the line-light-source elements 210-1 to 210-4 and the slits 222-1 to 222-4 are rotated at the same time. By virtue of this method, the display width in the vertical direction is expanded, thereby enabling presentation of three-dimensional images corresponding to a large screen.

A display screen in the horizontal direction can be easily expanded only by adding and disposing line-light-source units in parallel.

Figure 22A:
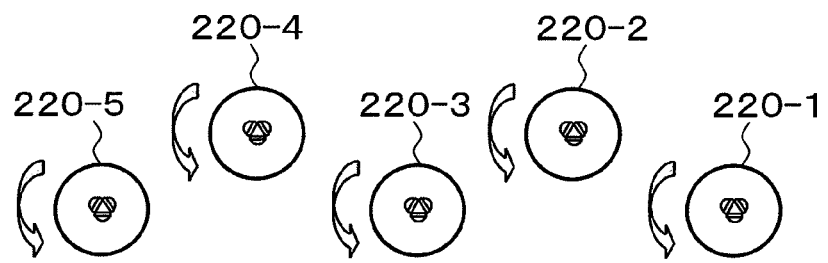
FIGS. 22A and 22B are drawings explaining arrangement examples of a plurality of line-light-source units.
Figure 22A:
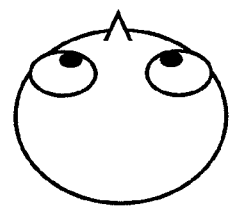
Figure 22B:
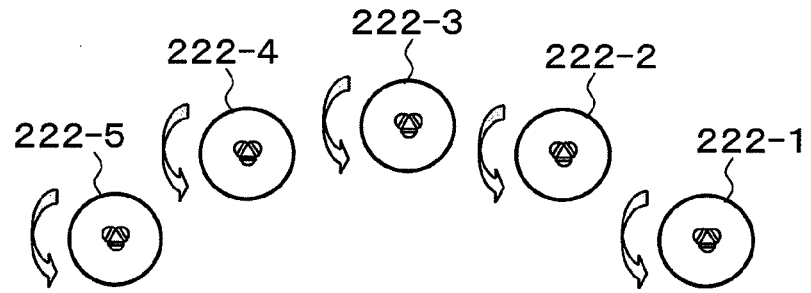
Figure 22B:
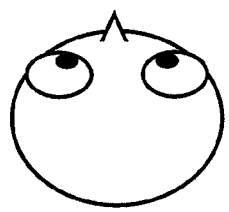

FIGS. 22A and 22B are drawings explaining the arrangement of a plurality of line-light-source units according to the present invention. The arrangement of a plurality of line-light-source units has been explained above as a linear arrangement; however, the method according to the present invention does not largely depend on the arrangement of the line-light-source units, and the line-light-source units 220-1 to 220-5 may be disposed zigzag as shown in FIG. 22A. As shown in FIG. 22B, the line-light-source units 220-1 to 220-5 may be disposed on a circumference surrounding a viewer. One of the characteristics of the line-light-source unit according to the present invention is that light can be emitted from 360 degrees by one unit and that the unit can be disposed at an arbitrary position. By virtue of such an arrangement, stereoscopic images can be further effectively presented. Explanations have been provided above by using the embodiments of the present invention. However, the technical range of the present invention is not limited to the range described in the above described embodiments. Various changes or modifications can be made in the above described embodiments. According to claims, it is obvious that the modes with such changes or modifications are also included in the technical range of the present invention. For example, the slit may be formed obliquely. Furthermore, light is not always required to be emitted in 360 degrees, and, if installed to face a wall, light-ray emission of 180 degrees is enough. In that case, causing one line-light-source element to stand still and rotating the slit is enough. The present invention employs the arrangement in which the cylindrical line-light-source unit is placed in space; therefore, the unit can be installed in the state in which not a large wind pressure is received. The characteristic can be utilized particularly outdoors. For example, information such as advertisement can be presented in the space without a light source such as the part between a building and a building. The present invention can be also used in the manner that the unit is installed at an existing one-dimensional pillar or the like of, for example, an outdoor fence, rack top, or floor, wherein people can pass through space part. Moreover, wide utilization methods are conceivable, for example, the present invention can be also used at a place where many people gather in a ski site or amusement park.

The invention claimed is:

1. A three-dimensional information presentation device comprising:
    a control unit;
    a plurality of separate line-light-source units;
    the control unit carrying out control of:
        transmitting thinned three-dimensional image information to the plurality of separate line-light-source units, a part of the thinned three-dimensional image information being allocated to each of the separate line-light source units;
        presenting thinned images for providing parallax corresponding to an angle of rotation of each of the separate line-light-source units;
        presenting an entire apparent three-dimensional image by scrolling the thinned images,
    wherein the plurality of separate line-light-source units are arranged on a straight line, and
    wherein the plurality of separate line-light-source units present the thinned images in different directions while rotating for providing the parallax and presenting the entire apparent three-dimensional image.

2. The three-dimensional information presentation device according to claim 1, wherein
    each of the line-light-source units has:
    a line-light-source element having a plurality of point light sources disposed in parallel to a rotation center axis, the plurality of point light sources being linearly disposed to constitute a point-light-source column configuration; and
    at least one linear opening in front of at least one of the line-light-source elements to correspond to the line-light-source elements, the at least one linear opening allowing passage of light.

3. The three-dimensional information presentation device according to claim 2, wherein
    each of the line-light-source units rotates while at least one of the line-light-source elements and the at least one linear opening are integrated.

4. The three-dimensional information presentation device according to claim 1, wherein the plurality of separate line-light-source units:
    enable emission of light in a full-circle direction by disposing a plurality of line-light-source elements;
    cause the plurality of line-light-source elements to stand still; and
    rotate an opening in front of the line-light-source elements.

5. The three-dimensional information presentation device according to claim 1, wherein the plurality of separate line-light-source units:
    enable emission of light in a full-circle direction by disposing a plurality of the line-light-source elements;
    have an opening corresponding to a front of each of the plurality of line-light-source elements, and integrally rotate the plurality of line-light-source elements and the openings.

6. The three-dimensional information presentation device according to claim 1, wherein
    each of the line-light-source units has:
    three line-light-source elements including a red line-light-source element, a green line-light-source element, and a blue line-light-source element which are three primary colors of light;
    an opening corresponding to a front of each of the line-light-source elements, and
    wherein the line-light-source elements and the openings are integrally rotated.

7. The three-dimensional information presentation device according to claim 1, wherein
    the control unit further carries out control of:
    presenting the thinned three-dimensional image information to the plurality of separate line-light-source units by giving signals to the plurality of separate line-light-source units, the signals for presenting mutually different image information corresponding to the direction of a light ray from the rotating plurality of separate line-light-source units in order to display the thinned images producing the parallax between left and right eyes of a viewer.

8. The three-dimensional information presentation device according to claim 7, wherein
    the control unit further carries out control of:
    presenting the thinned three-dimensional image information partially thinned, and synchronously scrolling and presenting blinking of light sources among the plurality of separate line-light-source units in order to present the thinned three-dimensional information as the entire apparent three-dimensional image.

9. A three-dimensional information presentation device comprising:
a control unit;
a plurality of separate line-light-source units;
the control unit carrying out control of:
transmitting thinned three-dimensional image information to the plurality of separate line-light-source units, a part of the thinned three-dimensional image information being allocated to each of the separate line-light-source units;
presenting thinned images for providing parallax corresponding to a direction of each of the separate line-light-source units;
scrolling the thinned images presented to the plurality of separate line-light-source units to present an entire apparent three-dimensional image;
wherein the plurality of separate line-light-source units are arranged on a straight line, and
wherein each of the separate line-light-source units has a plurality of light sources disposed with at least one opening provided in front, the plurality of light sources being disposed at positions mutually shifted on an isoperimetric surface so that concentric circles of rotation of the plurality of light sources are not overlapped in a direction of a rotation axis, the plurality of separate line-light-source units presenting the thinned images in mutually different directions while rotating to present the entire apparent three-dimensional image.

10. The three-dimensional information presentation device according to claim 9, wherein
each of the separate line-light-source units has:
the plurality of light sources disposed with different angles so that the plurality of light sources are continuous; and
the at least one opening being a linear opening allowing transmission of light in front of a column of the plurality of light source so as to correspond to the plurality of light sources.

11. The three-dimensional information presentation device according to claim 9, wherein
the plurality of separate line-light-source units rotate while the plurality of light sources and the at least one opening are integrated.

12. The three-dimensional information presentation device according to claim 1, wherein
the plurality of separate line-light-source units are changeable to an arbitrary position.

13. The three-dimensional information presentation device according to claim 9, wherein
the plurality of separate line-light-source units are changeable to an arbitrary position.

14. The three-dimensional information presentation device according to claim 1, wherein
each of the plurality of separate line-light-source units has at least one line-light-source element and a discrete barrier surrounding the at least one line-light-source element, each barrier having at least one linear opening.

15. The three-dimensional information presentation device according to claim 9, wherein
each of the plurality of separate line-light-source units has a discrete barrier surrounding the corresponding plurality of light sources of each separate line-light-source unit, each barrier of the plurality of separate line-light-source units having the at least one opening, the opening being a linear opening.

16. The three-dimensional information presentation device according to claim 1, wherein
each of the plurality of separate line-light-source units has at least one light source and a respective barrier surrounding the at least one light source, the respective barrier having at least one opening, and a central axis of the respective barrier is coaxial with a central axis of the at least one light source.

17. The three-dimensional information presentation device according to claim 9, wherein
each of the plurality of separate line-light-source units has a respective barrier surrounding the plurality of light sources, the respective barrier having the at least one opening, and the respective barrier has a central axis coaxial with a central axis of the plurality of light sources.

* * * * *